US008804741B2

(12) United States Patent
Bennett et al.

(10) Patent No.: US 8,804,741 B2
(45) Date of Patent: *Aug. 12, 2014

(54) METHOD AND SYSTEM FOR HANDLING OUT-OF-ORDER SEGMENTS IN A WIRELESS SYSTEM VIA DIRECT DATA PLACEMENT

(75) Inventors: James D. Bennett, Prague (CZ); Jeyhan Karaoguz, Irvine, CA (US); Uri Elzur, Irvine, CA (US); Matthew Fischer, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 194 days.

This patent is subject to a terminal disclaimer.

(21) Appl. No.: 12/917,573

(22) Filed: Nov. 2, 2010

(65) Prior Publication Data

US 2011/0044164 A1 Feb. 24, 2011

Related U.S. Application Data

(63) Continuation of application No. 11/126,464, filed on May 11, 2005, now Pat. No. 7,826,457.

(60) Provisional application No. 60/569,988, filed on May 11, 2004.

(51) Int. Cl.
   *H04L 12/28* (2006.01)
   *H04J 3/24* (2006.01)

(52) U.S. Cl.
   USPC .................. 370/394; 370/473; 370/474

(58) Field of Classification Search
   None
   See application file for complete search history.

(56) References Cited

U.S. PATENT DOCUMENTS

| 6,160,501 A | 12/2000 | Tallam |
| 6,629,151 B1 | 9/2003 | Bahl |
| 6,708,233 B1 | 3/2004 | Fuller et al. |
| 6,839,347 B1 * | 1/2005 | Ishida et al. .................. 370/389 |
| 7,007,103 B2 | 2/2006 | Pinkerton et al. |
| 7,046,625 B1 * | 5/2006 | Kasper .......................... 370/230 |
| 7,162,630 B2 | 1/2007 | Sperry et al. |
| 7,295,528 B2 * | 11/2007 | Ibrahim et al. ................ 370/310 |
| 2003/0128704 A1 | 7/2003 | Mizrachi et al. |
| 2004/0042458 A1 * | 3/2004 | Elzu .............................. 370/394 |
| 2005/0135415 A1 * | 6/2005 | Fan et al. ...................... 370/468 |
| 2005/0207363 A1 * | 9/2005 | Yen et al. ...................... 370/310 |

FOREIGN PATENT DOCUMENTS

| EP | 1 460 804 | 9/2004 |
| EP | 1 460 805 | 9/2004 |
| EP | 1 460 818 | 9/2004 |
| WO | WO 2004/021626 | 3/2004 |

* cited by examiner

*Primary Examiner* — Hassan Phillips
*Assistant Examiner* — Hicham Foud
(74) *Attorney, Agent, or Firm* — Brinks Gilson & Lione

(57) ABSTRACT

A method for processing information in a wireless system including a host device, the host device including a wireless network processor, the method including receiving by the wireless network processor, at least one out-of-order frame. The wireless network processor may place data of the received at least one out-of-order frame in a memory, and may manage information relating to one or more holes resulting from the at least one out-of-order frame in a TCP receive window. The wireless network processor may set a programmable limit with respect to a number of holes allowed in the TCP receive window. The memory may include a local memory outside of the host device and/or a host memory within the host device.

20 Claims, 18 Drawing Sheets

METHOD AND SYSTEM FOR HANDLING OUT-OF-ORDER SEGMENTS IN A WIRELESS SYSTEM VIA DIRECT DATA PLACEMENT

CROSS-REFERENCE TO RELATED APPLICATIONS/INCORPORATION BY REFERENCE

This application makes reference to, claims priority to, and claims the benefit of U.S. patent application Ser. No. 11/126,464 filed May 11, 2004.

This application makes reference to:

U.S. application Ser. No. 10/652,270 filed Aug. 30, 2002; and

U.S. application Ser. No. 110/651,459 filed Aug. 30, 2002.

The above stated applications are hereby incorporated by reference herein in their entirety.

FIELD OF THE INVENTION

Certain embodiments of the invention relate to segmentation of information during communication. More specifically, certain embodiments of the invention relate to a method and system for handling out-of-order segments in a wireless system via direct data placement.

BACKGROUND OF THE INVENTION

The IEEE 802.11 standard provides a common medium access control (MAC) layer that is adapted to provide a variety of functions, which support 802.11 based wireless local area networks (WLANs). The MAC layer is adapted to facilitate and manage communication between access points (APs) and stations (STAs) over a shared wireless communication channel. The MAC layer is adapted to handle a plurality of functions such as scanning, authentication, association, power saving and fragmentation. Optional functions provided by the 802.11 MAC may comprise encryption and RTS/CTS handshaking.

The 802.11 standard comprise a passive scanning mode and an active scanning mode. In the passive scanning mode, a wireless station such as a wireless transceiver or NIC searches for service by listening for access points on a channel or on a succession of channels. No transmissions are made by a wireless station which is passively scanning. Within the 802.11 standard, passive scanning is defined as the mandatory scanning mode and active scanning is defined as an optional mode. In active scanning, each wireless transceiver or NIC sends probe frames which are intended to elicit a probe response frame in order to scan individual channels to locate access points. The best access point for tentative association is determined from the physical properties of the signals received at the wireless station from each of the access points, combined with various other information received during the scanning operation, such as access point supported rates, QOS capabilities, current load factor and the support of other features. An access point may periodically broadcast a beacon frame, which may be received by the wireless transceiver or STA receives during scanning. The beacon frame may comprise signal strength information for corresponding APs, as well as access point specific information such as service set identifier (SSID), and data rates that are supported by the access point. The wireless STA may determine which AP to connect based on the access point specific information received from one or more access points. During the optional active scanning mode, a wireless STA may broadcast a probe frame, and all access points receiving the probe frame may respond with their corresponding specific information such as SSID, signal strength, and supported data rates. Active scanning allows a wireless STA to receive a faster response, on average, from one or more access points, instead of having to wait for transmission of a beacon frame. One drawback with active scanning is that it imposes additional network overhead since probe frames are transmitted and response frames are received form responding APs. Additionally, the wireless STA performing the active scanning may interfere with the normal traffic of the network because the scanning STA has switched to the current channel with little information regarding the current channel state.

The 802.11 standard provides open system authentication methodology and a shared key authentication methodology for proving an identity of a networking entity such as a wireless STA. In the 802.11 standard, the open system authentication methodology is specified as being mandatory, while the shared key authentication methodology is specified as being optional. With open system authentication, a wireless STA may initiate authentication by sending an authentication request to an access point. In response, the access point may reply with an authentication response, which may approve or deny authentication. An approval or a denial of authentication may be indicated in a status code field within a frame. For optional shared key authentication, authentication may be effected based on whether an authenticating device such as a wireless STA possesses an appropriate wired equivalent privacy (WEP) key. In this regard, the wireless STA may send an authentication request to an access point and the access point may respond by placing challenge text within a response frame, which is sent to the wireless STA. The wireless STA is configured to encrypt the challenge text using its WEP key and the encrypted challenge text is then transmitted from the STA to the access point. Upon receiving the encrypted challenge text, the access point is adapted to decrypt the encrypted challenge text and compares it to the initial text. If the comparison of the decrypted text and the initial text indicates a match between the two, then the access point assumes that the wireless STA possesses the correct wired equivalency privacy key. As a result, the access point will send an authentication frame to the wireless STA, which indicates a service approval if there is a match or a service denial if the match fails.

After a wireless STA accesses the wireless medium and is authenticated, the wireless STA has to associate with the access point prior to start of data communication. Association allows tasks such as synchronization, and exchange of important information between an access point and a wireless STA. For example, during association, associated data rates may be communicated from an access point to a wireless STA. A wireless STA may be adapted to initiate association by communicating an association request comprising information such as supported data rates, optional capability support, security capability support, other optional feature support and SSID information. In response, an access point may communicate an association response frame comprising an association identifier (ID) and other access point specific information. Once the wireless STA and access point complete association, the wireless STA may then start communication of data frames with the access point.

The 802.11 standard provides an optional power save mode that may be enabled or disabled by a user, if available. If implemented, the power save mode allows a user to enable the wireless STA to turn ON or turn OFF its wireless transceiver as appropriate, in order to conserve battery power. For example, when it is not necessary for the wireless transceiver or STA to communicate information, the wireless STA may turn OFF its wireless transceiver. In instances when the power save mode is turned ON, a wireless STA may notify an access point of the possibility that it may enter a sleep state. A status bit in the header of each frame may be utilized to indicate the power save mode of the wireless STA. In this regard, the power save mode may be turned ON when this bit is asserted and turned OFF when this bit is deasserted. An access point is configured to keep track of each wireless station that indicates its intent to enter or exit the power save mode. This allows the access point to buffer packets for those wireless STAs that have indicated the possibility that they may enter sleep state while they are in sleep mode and to avoid buffering packets for those wireless STAs that have indicated their intent to exit (or not enter) sleep mode. The STAs which have entered sleep mode may periodically wake up from sleep state and check whether the access point has buffered data or whether new data is waiting to be delivered.

The IEEE 802.11 protocol provides support for two different medium access control (MAC) mechanisms that may be utilized for transporting asynchronous and time bounded services. The first mechanism is distributed coordination function (DCF) and the second is point coordination function (PCF). The distributed coordination function utilizes best effort for facilitating communication of information in which access devices with information to transmit have an equal opportunity to transmit information. The point coordination function maybe utilized to communicate time sensitive or latency sensitive information. In this regard, the point coordination function utilizes a polling mechanism, which may be controlled by an access point (AP) acting in the role of a Point Coordinator (PC).

Before transmitting frames, a station is required to first gain access to the shared wireless medium. The 802.11 standard defines a distributed coordination function (DCF) type of medium access and a point coordination function (PCF) of medium access. The DCF type of medium access is mandatory and it utilizes carrier sense multiple access with collision avoidance (CSMA/CA) protocol. DCF allows a plurality of wireless STAs to contend for access to the wireless medium when the wireless STAs attempt to send frames. The wireless STAs may utilize a binary back off mechanism to provide a fair medium access mechanism. Accordingly, a wireless STA will back off for a random amount of medium idle time before attempting to access the medium.

The MAC layer utilizes a network allocation vector (NAV) to ensure fair access to the medium. The NAV is a counter, which resides at each wireless station and represents the amount of time that a frame or sequence of frames will require to send data contained therein. In order to allow fair access to the medium, the MAC Layer checks the value of the network allocation vector (NAV). A wireless STA is allowed to send a frame when its NAV is zero and any backoff has been completed. A station is required to determine the amount of time that it will need to transmit the current frame plus any subsequent frames which are part of the same frame sequence, based on the length of the frames and the frames' data rates, before it is allowed to transmit a frame. The station will place this determined time in a duration field in the header of frames that are to be transmitted. When the wireless STAs receive the frame, the time is acquired from the duration field of the received frame and utilized to determine a corresponding value for their NAVs.

The random back off timer employed in DCF may be utilized by a STA to determine or detect whether the medium is accessible or busy. If it is determined that the medium is busy, a STA has to wait for a randomly generated period of time before another attempt is made at accessing the medium. This ensures a fair access mechanism and reduces the probability of multiple stations sending data on the medium at the same time. The random delay imposed by the back off prevents a plurality of wireless STAs from simultaneously sensing the medium as being idle at the conclusion of a singular transmission and subsequently attempting transmission at the same time, which would result in collisions. Accordingly, the random back off timer significantly reduces the number of collisions and hence the number of retransmissions and this is particularly important as the number of active wireless STAs increases.

A wireless STA may not listen for collisions while it is transmitting data because it cannot have its receiver turned ON while it is transmitting data. This means that a receiving wireless STA has to send an acknowledgement (ACK) whenever no errors are detected in a received frame. If a transmitting STA does not receive an ACK after a determined period of time has elapsed, the transmitting STA automatically assumes that a collision has occurred and will retransmit the frame on it own accord. The 802.11 standard provides time-bounded delivery of data frames via the optional point coordination function (PCF). In the optional point coordination function, an access point may grant access to the medium on a per station basis via polling during a contention free period. In this regard, a wireless STA has to be polled before it is allowed to transmit frames. PCF traffic may be communicated between alternate contention or DCF periods. In this regard, an access point may poll wireless STAs based on a polling list, and switches to a contention period during periods in which the wireless STA utilize DCF. This may permit a synchronous operating mode as well as an asynchronous operating mode. For example, the synchronous operating mode may be utilized to support video based applications and the asynchronous operating mode may be utilized to support browsing or messaging applications.

A wireless STA is adapted to encrypt the payload of each frame using a common WEP key prior to transmission of each frame. A receiving wireless STA or access point, upon receiving the encrypted frame, will decrypt the received encrypted frame using the common WEP key. There is a plurality of different size common WEP keys that are available and each is adapted to provide varying strengths of encryption. Additional security schemes are also supported by the protocol.

Handshaking signals, which comprise request-to-send (RTS) and clear-to-send (RTS/CTS) are utilized by an access point or STA to control access to, and use of, the wireless medium by RTS/CTS enabled STAs. A STA may establish a maximum frame length and whenever the maximum frame length is exceeded, RTS/CTS may be automatically utilized. Whenever a wireless STA activates RTS/CTS handshaking mechanism, the wireless STA will transmit an RTS frame to an access point or another STA before it transmits a data frame. In response, the access point or other STA will transmit a CTS frame, which indicates that the wireless STA may transmit the data frame. With regards to a CTS frame, an access point or STA may modify the duration value from the duration field within the frame header of the RTS frame and place this modified value into the duration field within the frame header of the CTS frame. This will bar other stations from transmitting until the wireless STA that initiated the RTS transmits the data frame has completed transmitting the data frame and has had an opportunity to have received the ACK frame.

During transmission, it may be more efficient to transmit smaller segments of information rather than larger segments of data. These smaller segments of information may be referred to as fragment. For example, a frame comprising L2 header information, L3 header information, L4 header information, ULP information and payload data may be segmented into a plurality of segments in which all the L3, L4, L5 headers are in a single fragment, the ULP information and a portion of the payload data may be in another fragment, and a remaining portion of the payload data may be fragmented into a plurality of other fragments. If the fragmentation occurs at the 802.11 layer, in compliance with the standard, a transmitter will not transmit these fragments out-of-order. In this regard, the transmitter may not begin the transmission of a subsequent (n+i) fragment, where i is greater than 1, until the $n^{th}$ or prior fragment has been successfully transmitted. Accordingly, out-of-order (OOO) fragments would not occur under such circumstances.

The standard distributed coordination function for medium access may be inefficient in terms of bandwidth utilization, especially at higher physical layer (PHY) speeds, for example, 54 Mbps or higher. The DCF may be adapted to solve problems such as network congestion and high packet error rate (PER) typically associated with some wireless links. The DCF may also exponentially increase backoff and positive acknowledgments (PACKs). The backoff time for each MAC protocol data unit (MPDU) may increase exponentially for retransmissions and the PACK for each MPDU may render bandwidth utilization inefficient at high physical layer (PHY) speeds. The RTS/CTS mechanism when utilized in conjunction with regular DCF, may diminish efficiency even more, and as a result, may be rarely utilized. For example, in a case where no RTS/CTS is utilized, transmitting a 1500 byte frame including MAC header at 54 Mbps takes 248 μs. The sum of the average backoff, PACK and the short interframe space (SIFS) takes 130 μs, when PACK is transmitted at 24 Mbps. The overhead air time may be more than half the data air time.

The distributed coordination function is not the most bandwidth efficient transport mechanism. The IEEE 802.11 standard defines a bursting method for MAC protocol data units (MPDUs), called fragmentation. In this regard, MAC service data units (MSDU) may be fragmented at the MAC level to a number of smaller MPDUs. The individual MPDUs comprising one MSDU may be transmitted in a "burst", in which the interframe spacing is a SIFS, and PACK frames follow the transmission of each fragment. Hence, a typical frame exchange sequence under fragmentation would be DATA-SIFS-PACK-SIFS-DATA-SIFS-PACK, for example, with an optional RTS/CTS exchange in the beginning. However, fragmentation was defined in the 802.11 standard as a means to combat unreliable wireless links having high packet error rates (PER). In reliable wireless links, that is, those with low packet error rates, fragmentation may decrease MAC efficiency, since it introduces MAC headers on each MPDU, and SIFS intervals between MPDUs and PACKs.

In order to address various issues dealing with quality of service (QoS) such as guaranteed delivery of a particular QoS and MAC efficiency, more efficient bandwidth allocation and usage mechanisms are required. The IEEE 802.11e draft standard defines block acknowledgement policies that eliminate the need for individually transmitted acknowledgements (PACKs) for each MPDU. This block acknowledgement scheme allows multiple fragments and/or frames to be sent at the MAC layer, without having to issue an individual positive acknowledgement for each fragment. However, this block PACK mechanism introduces extra overhead comprising block PACK request frames and block PACK response frames. Under the block acknowledgement scheme, a transmitter may send a parameterized number of frames before a block PACK response is received, which acknowledges receipt of the frames in the blocks. MAC layer acknowledgement mechanisms notwithstanding, there are instances when out-of-order TCP segments may be transmitted and accordingly, this will lead to out-of-order fragments. The IEEE 802.11e draft standard also defines contention free periods of time allocated to specific devices, where frames may be transmitted with a SIFS period of separation, rather than the previously described back off separations between frames transmitted by a single wireless STA. The mechanism for this allocation may be complex, and may include overhead for the polling mechanisms involved.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for handling out-of-order segments in a wireless system via direct data placement, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for handling out-of-order fragments or segments in a wireless system via direct data placement.

Figure 1A:
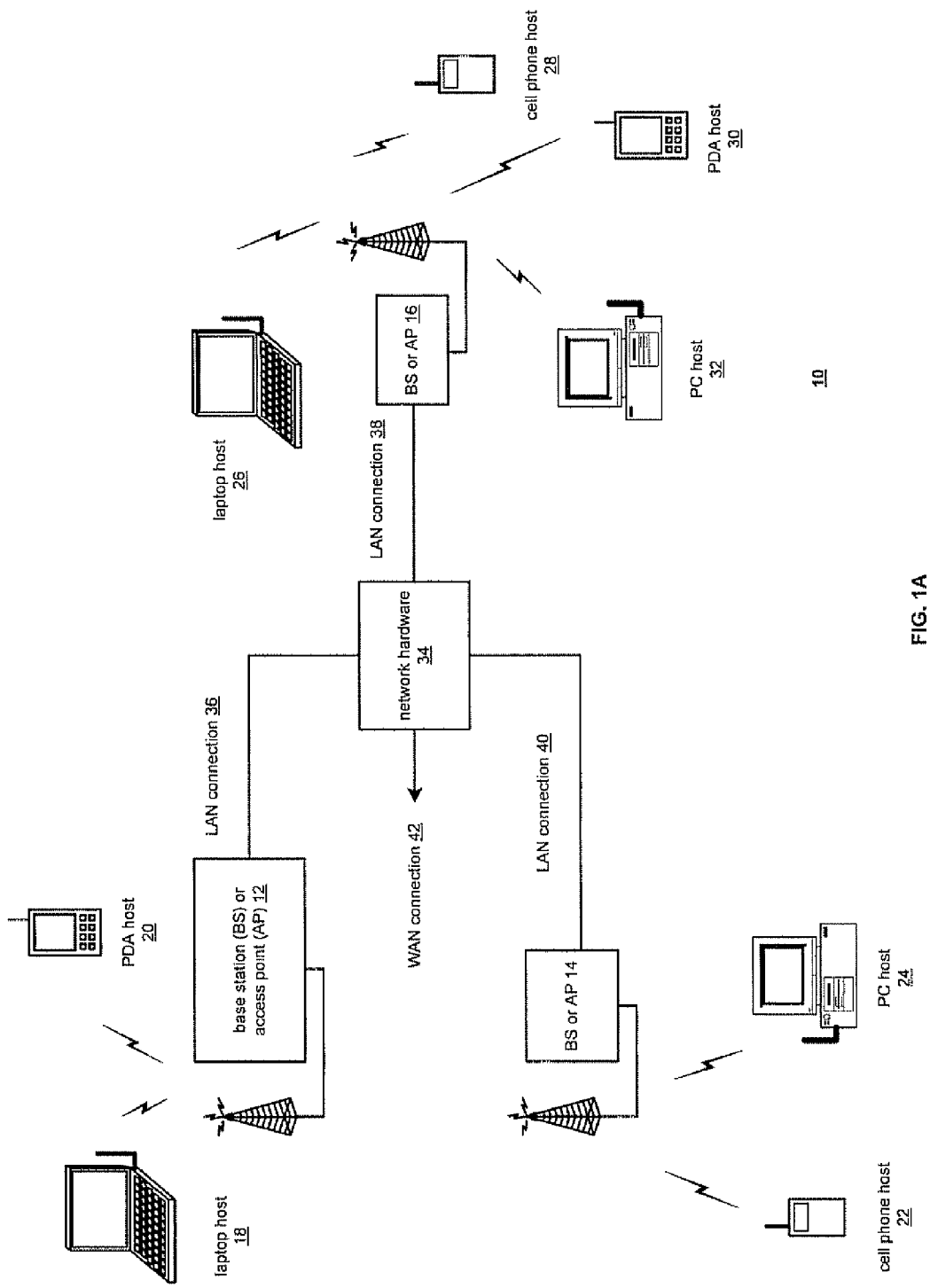
FIG. 1A illustrates a block diagram of a wireless communication system in accordance with an embodiment of the present invention.

FIG. 1A illustrates a block diagram of a wireless communication system in accordance with an embodiment of the present invention. Referring to FIG. 1A, there is shown a communication system 10 that comprises a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28.

The base stations or access points 12-16 may be operably coupled to the network hardware 34, for example, via local area network connections 36, 38 and 40. The network hardware 34, for example, a router, switch, bridge, modem, or system controller, may provide a wide area network connection 42 for the communication system 10. Each of the base stations or access points 12-16 may have an associated antenna or antenna array to communicate with the wireless communication devices in its area. Typically, the wireless communication devices may register with a particular base station or access point 12-16 to receive services from the communication system 10. For direct connections, for example, point-to-point communications, wireless communication devices may communicate directly via one or more allocated channels. In general, base stations are used for cellular telephone systems and similar type of systems, while access points are used for in-home or in-building wireless networks. Regardless of the particular type of communication system, each wireless communication device includes a built-in radio and/or is coupled to a radio.

Figure 1B:
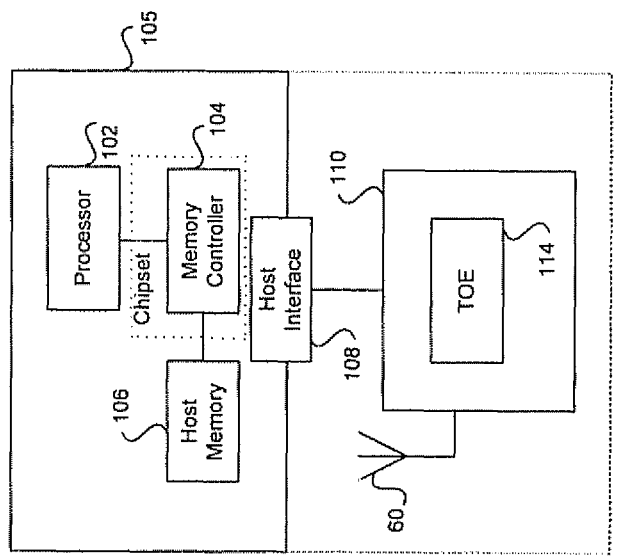
FIG. 1B is a block diagram of an exemplary system that may be utilized in connection with handling out-of-order segments in a wireless system, in accordance with an embodiment of the invention.

FIG. 1B is a block diagram of an exemplary system that may be utilized in connection with handling out-of-order segments in a wireless system, in accordance with an embodiment of the invention. Referring to FIG. 1B, the system may comprise a processor 102, a memory controller 104, a host memory 106, a host interface 108, a wireless network interface processing system 110 and an antenna 112. In one embodiment of the invention, the memory controller 104 may be integrated with the processor 102. The wireless network interface processing system 110 may be referred to as a wireless network processor 110.

The wireless network processor 110 may comprise, for example, a TCP offload engine (TOE) 114 or integrated wireless network processor chip or chipset. The wireless network processor 110 may comprise, for example, a wireless network interface card (WNIC) and/or wireless networking interface processing logic, circuitry and/or code. For example, the wireless network interface processing logic may comprise a single wireless network chip or processor or a chipset adapted to provide similar type functions. In one embodiment of the invention, the wireless network interface card may be coupled to the host 105 via the host interface 108. The host interface 108 may be, for example, a universal serial bus (USB), a peripheral component interconnect (PCI), PCI-X, ISA, SCSI or other type of bus. The memory controller 106 may be coupled to the processor 104, to the memory 106 and to the host interface 108. The system of FIG. 1B may be adapted to handle out-of-order (OOO) transmission control protocol (TCP) datagrams in a flow-through manner according to aspects of the invention.

Figure 1C:
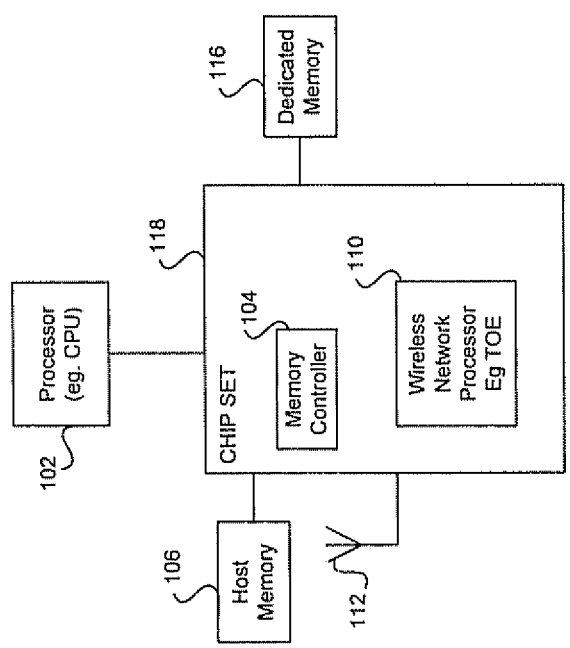
FIG. 1C is a block diagram of another exemplary system that may be utilized in connection with out-of-order segments in a wireless system, in accordance with an embodiment of the invention.

FIG. 1C is a block diagram of another exemplary system that may be utilized in connection with out-of-order segments in a wireless system, in accordance with an embodiment of the invention. Referring to FIG. 1C, the system may include, for example, a processor 102, a host memory 106, a dedicated memory 116 and a chip set 118. The chip set 118 may comprise, for example, the wireless network processor 110. The chip set 118 may be coupled to the CPU 102, to the host memory 106, and to the dedicated memory 116 and to the antenna 112. The wireless network processor 110 of the chip set 118 may comprise a TOE, and may be coupled to the antenna 112. The dedicated memory 116 may provide buffers for context and/or data. The system of FIG. 1C may be adapted to handle out-of-order (OOO) transmission control protocol (TCP) datagrams, for example, in a flow-through manner according to various aspects of the invention.

The dedicated memory 116 may provide buffers for context and/or data. A plurality of options exists for storing buffers for context. These may comprise, storing context in the TOE 114, storing context in the dedicated memory 116, and storing context in the host memory 106. Accordingly, the various exemplary configurations illustrated in FIG. 1A, FIG. 1B, FIG. 1C and FIG. 1D possess the capability to handle the storing of context in via these storage options.

Although various exemplary embodiments of the invention may be illustrated, for example, as a CPU and a wireless interface comprising an antenna, the present invention need not be so limited to such examples. Accordingly, various embodiments of the invention may employ, for example, any type of circuitry and/or processor and any type of data link layer or physical media, respectively. Accordingly, although illustrated as coupled to the antenna 112 or the TOE 114 of FIG. 1B may be adapted to handle any type of data link layer or physical media. Furthermore, the present invention also contemplates different degrees of integration and separation between the components illustrated in FIGS. 1B-C. For example, the TOE 114 may be a separate integrated chip from the chipset 118 embedded on a circuit board or may be embedded in a WNIC. In addition, the dedicated memory 116 may be integrated with the chip set 118 or may be integrated with the wireless network processor 110 of FIG. 1C.

Figure 1D:
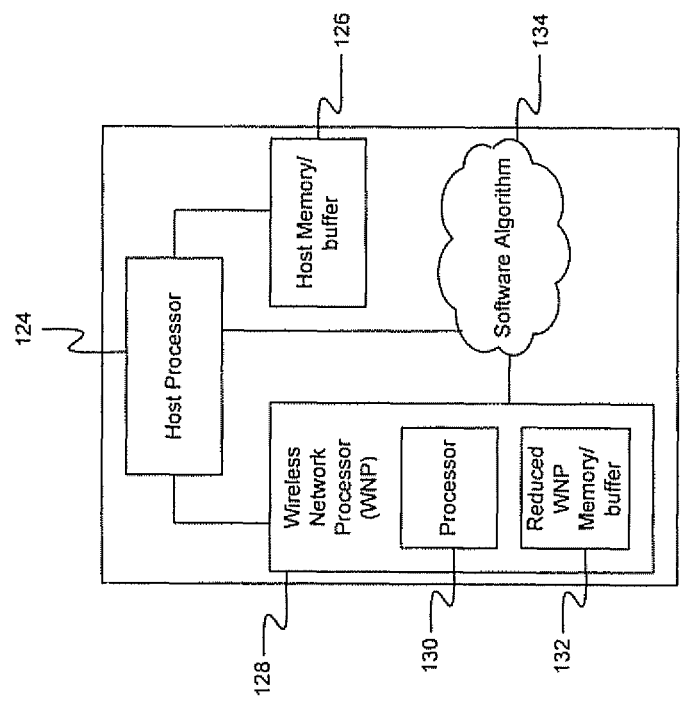
FIG. 1D is an alternative embodiment of an exemplary system that may be utilized for handling out-of-order (OOO) TCP segments, in accordance with an embodiment of the invention.

FIG. 1D is an alternative embodiment of an exemplary system that may be utilized for handling out-of-order (OOO) TCP segments, in accordance with an embodiment of the invention. Referring to FIG. 1D, there is shown a host processor 124, a host memory/buffer 126, a software algorithm block 134 and a wireless network processor block 128. The wireless network processor block 128 may comprise a network processor 130 and a reduced wireless network processor memory/buffer block 132.

The software algorithm 134 may comprise code that may be adapted to control the host processor 124 and/or the wireless network processor (WNP) 128 for processing out-of-order (OOO) TCP segments, in accordance with an embodiment of the invention. Out-of-order TCP segments may be parsed and TCP context information may be acquired. The host processor 124 may determine the boundaries for the header information and payload and the payload data may be mapped to the host memory/buffer 126. After mapping, the payload data may be transferred to the host memory/buffer 126

Figure 1E:
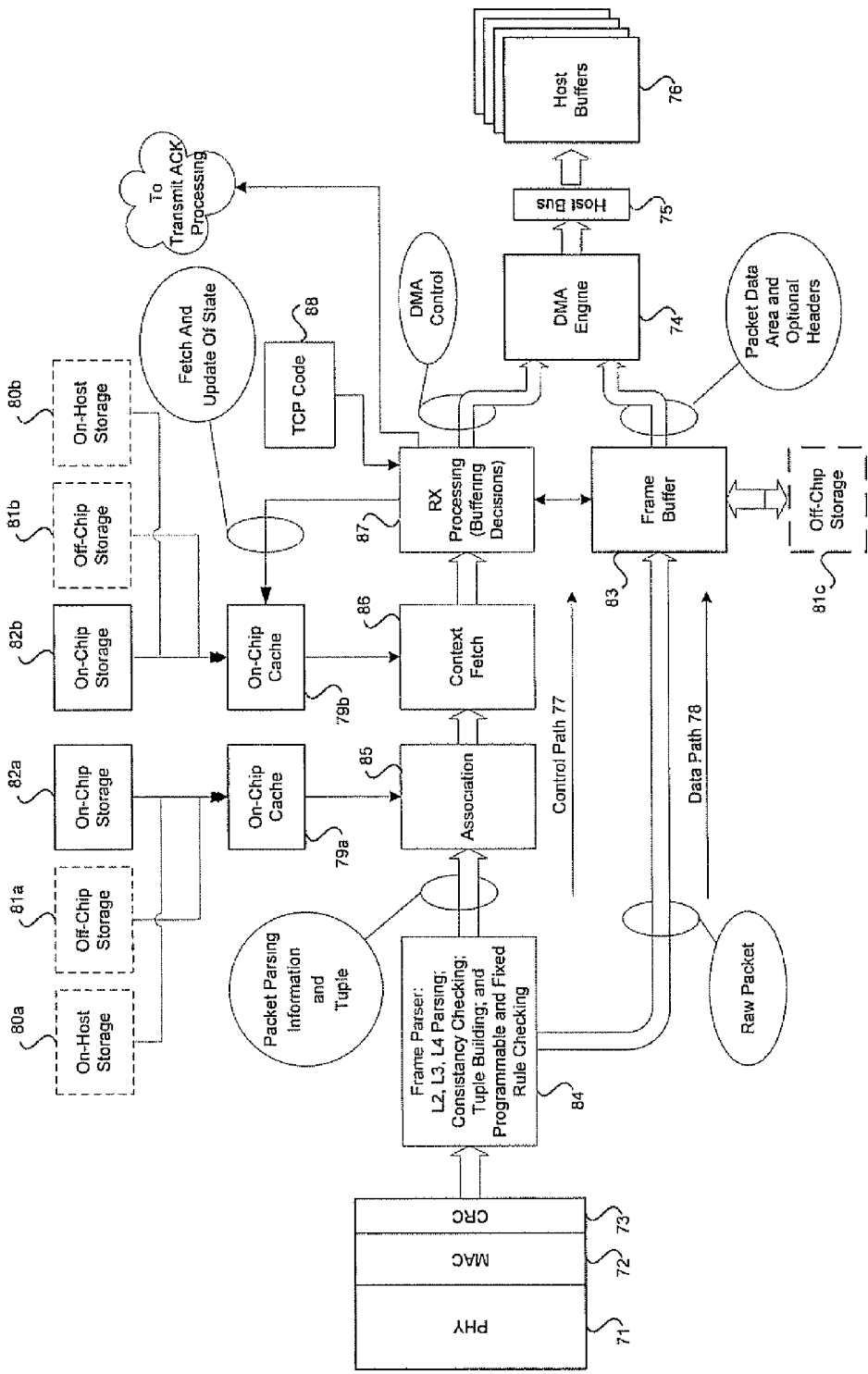
FIG. 1E is a block diagram of a system for handling out-of-order (OOO) transmission control protocol (TCP) datagrams in a flow-through manner, in accordance with an embodiment of the invention.

FIG. 1E is a block diagram of a system for handling out-of-order (OOO) transmission control protocol (TCP) datagrams in a flow-through manner, in accordance with an embodiment of the invention. Referring to FIG. 1E, there is shown a physical (PHY) 71, medium access control (MAC) block 72, CRC block 73, a DMA engine, a host bus 75, host buffer block 76, control path 77, data path 78, frame buffer 83, frame parser block 84. FIG. 1E further comprises a plurality of memory options including on chip cache block 79a, 79b, on-host storage block 80a, 80b, off-chip storage 81a, 81b, 81c and on-chip storage 82a, 82b.

In general, incoming frames may be subject to L2 processing including, for example, address filtering, frame validity and error detection. An incoming frame, after being processed by the PHY 71, MAC 72 and CRC block 72, may be communicated to the frame parser block 84 for parsing. The frame parsing block 84 may be adapted to parse control information and actual payload data from a frame. The frame parsing block 84 may be adapted to facilitate parsing of L2, L3, L4 header information, consistency checking, tuple lookup, and programmable and fixed rule checking. After frame parsing block 84 has completed parsing, resulting control information may be communicated via a control path 77 for processing and payload data and/or raw packet data may be communicated via a data path 78 for processing. The raw packet data may comprise optional header information. The parsed payload packet data may be buffered in the frame buffer block. In an alternative embodiment of the invention, at least a portion of the parsed payload packet may be stored in an off-chip storage block such as the off-chip storage block 81c. In this regard, raw packet information and/or payload data may be moved in and out of the frame buffer to the off-chip storage. The DMA engine 74 may move DMA data out of the frame buffer into buffers in the host buffer block 76.

Unlike an ordinary Ethernet controller, the next stage of processing may include, for example, L3 such as IP processing and L4 such as TCP processing. The wireless network processor 110 may reduce the host CPU utilization and memory bandwidth, for example, by processing traffic on hardware offloaded TCP/IP connections. The wireless network processor 110 may detect, for example, the protocol to which incoming packets belong. For TCP, the wireless network processor 110 may detect whether the packet corresponds to an offloaded TCP connection, for example, a connection for which at least some TCP state information may be kept by the network system wireless network processor 110. Once a connection has been associated with a packet or frame, any higher level of processing such as L5 or above may be achieved. If the packet corresponds to an offloaded connection, then the wireless network processor 110 may direct data movement of the data payload portion of the frame. The destination of the payload data may be determined from the connection state information in combination with direction information within the frame. The destination may be a host memory, for example. Finally, the wireless network processor 110 may update its internal TCP and higher levels of connection state and may obtain the host buffer address and length from its internal connection state.

The system components in the control path 77 may be utilized to handle various processing stages used to complete, for example, the L3/L4 or higher processing with maximal flexibility and efficiency and targeting wire speed. These components may include the association block 85, context fetch block 86, receive (Rx) processing block 87, TCP code 88, and the cache and storage blocks. The result of the stages of processing may include, for example, one or more packet identification cards (PID_Cs) that may provide a control structure that may carry information associated with the frame payload data. This may have been generated inside the wireless network processor 110 while processing the packet in the various blocks. The receive processing block 87 may comprise suitable logic, circuitry and/or code that may be adapted to generate buffer control information that may be utilized to control the DMA engine 74.

After the frame parser block 84 parses the TCP/IP headers from an incoming frame, the association block 85 may associate the frame with an end-to-end TCP/IP connection. The context fetch block 86 may be adapted to fetch the TCP connection context and processing the TCP/IP headers. Header and/or data boundaries may be determined and data may be mapped to one or more host buffer(s) in the host buffer block 76. The DMA engine 74 may be adapted to DMA transfer the data into the buffers in the host buffer block 76 via the host bus 75. The headers may be consumed on chip or transferred to the host via the DMA engine.

The frame buffer 83 may be an optional block in the receive system architecture. It may be utilized for the same purpose as, for example, a first-in-first-out (FIFO) data structure is used in a conventional L2 NIC or for storing higher layer traffic for additional processing. The frame buffer 83 in the receive system may not be limited to a single instance and accordingly, there may be multiple instances of the frame buffer block 83. In one embodiment of the invention, one instance of a FIFO may be utilized for multiple connections. As control path 77 handles the processing of parsed control information, the data path 78 may store corresponding data between data processing stages one or more times depending, for example, on protocol requirements.

Figure 1F:
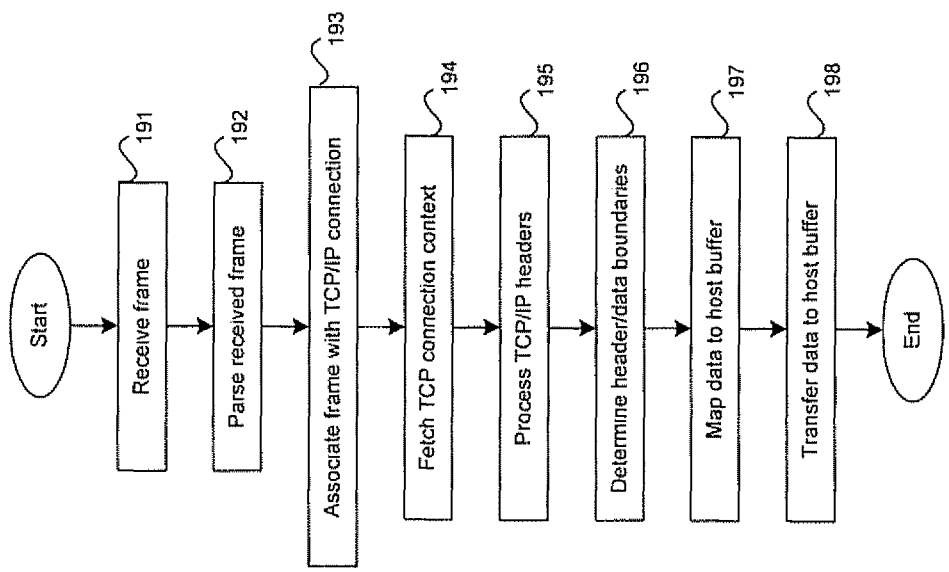
FIG. 1F is a flowchart illustrating exemplary steps for frame reception, in accordance with an embodiment of the invention.

FIG. 1F is a flowchart illustrating exemplary steps for frame reception, in accordance with an embodiment of the invention. Referring to FIG. 1E and FIG. 1F, in step 191, the wireless network processor 110 may receive a frame from, for example, the antenna 112. In step 192, the frame parser 84 may parse the frame, for example, to find the L3 and L4 headers. The frame parser 84 may process the L2 headers leading up to the L3 header, for example IP version 4 (IPv4) header or IP version 6 (IPv6) header. The IP header version field may be utilized to determine whether the frame carries an IPv4 datagram or an IPv6 datagram.

For example, if the IP header version field carries a value of 4, then the frame may carry an IPv4 datagram. If, for example, the IP header version field carries a value of 6, then the frame may carry an IPv6 datagram. The IP header fields may be extracted, thereby obtaining, for example, the IP source (IP SRC) address, the IP destination (IP DST) address, and the IPv4 header "Protocol" field or the IPv6 "Next Header". If the IPv4 "Protocol" header field or the IPv6 "Next Header" header field carries a value of 6, then the following header may be a TCP header. The results of the parsing may be added to the PID_C and the PID_C may travel with the packet inside the wireless network processor 110.

The rest of the IP processing may subsequently occur in a manner similar to the processing in a conventional off-the-shelf software stack. Implementation may vary from the use of firmware on an embedded processor to a dedicated, finite state machine, which may be potentially faster, or a hybrid of a processor and a state machine. The implementation may vary with, for example, multiple stages of processing by one or more processors, state machines, or hybrids. The IP processing may include, but is not limited to, extracting information relating to, for example, length, validity and fragmentation. The located TCP header may also be parsed and processed. The parsing of the TCP header may extract information relating to, for example, a source port and a destination port.

The TCP processing may be divided into a plurality of additional processing stages. In step 193, the frame may be associated with an end-to-end TCP/IP connection. After L2 processing, in one embodiment, the present invention may provide that the TCP checksum be verified. The end-to-end connection may be uniquely defined by, for example, the following 5 tuple: IP Source address (IP SRC addr); IP destination address (IP DST addr); L4 protocol above the IP protocol such as TCP, UDP or other upper layer protocol; TCP source port number (TCP SRC); and TCP destination port number (TCP DST). The process may be applicable for IPv4 or IPv6 with the choice of the relevant IP address. In step 194, TCP connection context may be fetched. In step 195, the TCP/IP headers may be processed. In step 196, boundaries for the header and payload data may be determined. This may include TCP options and any upper layer protocol (ULP) header. Additional processing for the TCP options or ULP may precede payload mapping and placement. In step 197, payload data may be mapped to one or more host buffers. In step 198, payload data may be transferred to the host buffers to which they were mapped.

As a result of the frame parsing in step 192, the 5 tuple may be completely extracted and may be available inside the PID_C. Association hardware may compare the received 5 tuple with a list of 5 tuples stored in the wireless network processor 110. The wireless network processor 110 may maintain a list of tuples representing, for example, previously handled off-loaded connections or off-loaded connections being managed by the wireless network processor 110. The memory resources used for storing the association information may be costly for on-chip and off-chip options. Therefore, it is possible that not all of the association information may be housed on chip. A cache may be used to store the most active connections on chip. If a match is found, then the wireless network processor 110 may be managing the particular TCP/IP connection with the matching 5 tuple.

Figure 1G:
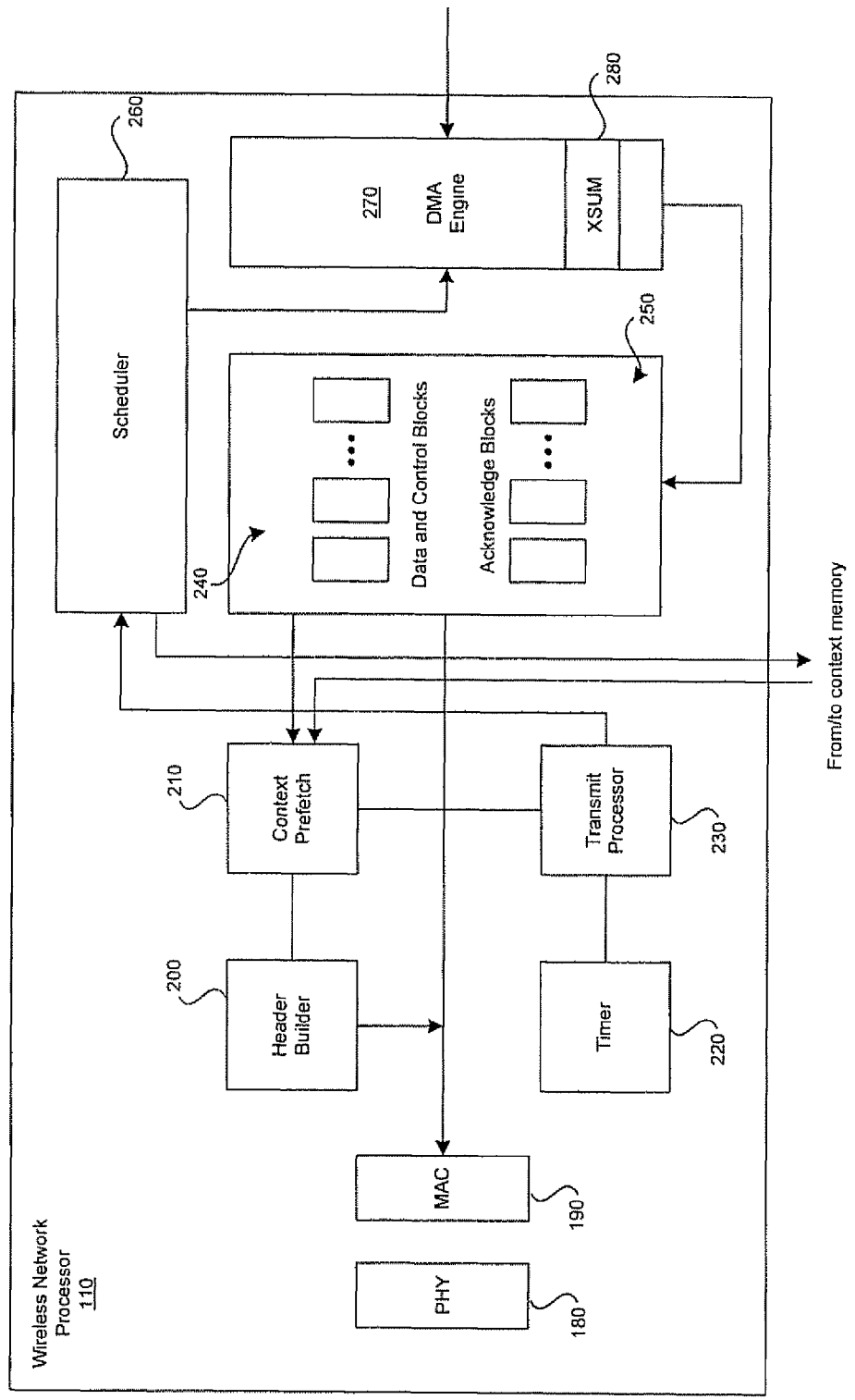
FIG. 1G illustrates an exemplary transmission path, in accordance with an embodiment of the invention.

FIG. 1G illustrates an exemplary transmission path, in accordance with an embodiment of the invention. Referring to FIG. 1G, the wireless network processor 110 may comprise, for example, a physical layer (PHY) 180, a MAC layer 190, a header builder 200, a context prefetch 210, a timer block 220, a transmit processor 230, data and control blocks 240, acknowledge blocks 250, a scheduler 260 and a DMA engine 270. The timer block 220 may comprise, for example, TCP state transmit and retransmit timers. The scheduler 260 may be adapted for, for example, selection of next connection to have an opportunity to transmit, fairness and multiple connection requesting access to the medium, windowing and/or retransmit arbitration. The DMA engine 270 may include, for example, an XSUM block 280 or other data specific processing. For example, CRC for protocols requiring it such as iSCSI. This may include inserting of data into the data provided by the host and computing CRC values.

On the transmission path, the support for L4 and higher levels may include additional complexity and functionality. Transmission may include performing, for example, one or more of the following: scheduling transmission flow; transferring data via DMA; fetching context; transmit processing; adding L5 or higher and TCP/IP headers; arming the timers; and L2 transmitting.

The scheduler 260 may be adapted to determine which flow should be served next. The scheduler 260 may also be adapted to handle multiplexing of L2, L4 and higher levels of traffic. With respect to L4 and higher levels of traffic, the decision to schedule a particular TCP/IP flow for transmission may depend upon, for example, one or more of the following factors: data availability for transmission on the host side; remote end buffering state such as when a remote TCP connection has not closed the TCP window; preventing starvation among the potentially large number of TCP connections competing for time on the media; availability of TCP acknowledges from the receive side; and a need to retransmit information on behalf of a TCP connection.

Utilizing some or all of the above-identified information or other information, the scheduler 260 may pick the next flow to be transmitted. In one embodiment of the invention, the scheduler 260 may comprise suitable logic, circuitry and/or code that may be adapted to fetch the pointer to the next host resident buffer from the context information. The scheduler 260 may also program the DMA engine 270 to get the data and store the data, for example, in the on-chip FIFO buffer.

The DMA engine 270 may comprise suitable logic, circuitry and/or code that may be adapted to transfer the data from the host buffer or buffers into, for example, an on-chip, transmit-side FIFO buffer. An IP checksum such as an IPv4 checksum and/or a TCP checksum may be computed for data that is being transferred. The computations may be performed concurrently with data movement. Higher levels of data processing may also be done at this stage.

Flow context may be fetched, for example, by the context prefetch 220 from a central context resource. Accessing the central context resource may increase the usefulness of a locking mechanism among all of its consumers to ensure data integrity and coherency. The locking mechanism may be very efficient in minimizing undesired performance impact. The context for the selected flow may be provided to the transmit processor 230 such as a CPU and/or finite state machine (FSM).

The transmit processor 230 may be adapted, for example, to execute TCP/IP and higher levels of code, to update the context and to generate the TCP/IP and higher level header variables to be placed in the headers. The updated context may be stored. The processing for this stage may be performed by one or more stages including one or more processors, state machines or hybrid processors.

The header builder 200 may be adapted to utilize the header variables generated by transmit processor 230 and may generate the TCP/IP and higher level headers and/or trailers, and may attach the TCP/IP and higher level headers in front of the data to be transmitted. Using the partial checksum results obtained from the DMA engine 270, the header builder 200 may finalize the checksum fields and may place them in the respective headers. Transmit processing is not limited to a specific number of stages and processing and may be executed at different stages of processing as may be optimal.

The timer 220 may be armed by the transmit processor 230 and may update its future timer event list. When the L4 and higher levels of processing are complete, the L2 processing and transmission may follow the conventional steps performed by a conventional wireless controller.

A retransmission event is similar to a normal transmission except, for example, the data to be retransmitted may be fetched from the host buffers as before or from any other temporary holding buffer or cache. The address for this data may be computed. The computation of the host buffer address may be more complex. The same mapping function described in the receive path section may be utilized for the retransmission TCP sequence number range. Once the buffer address is determined, the rest of the transmit process may occur as described above.

For data reassembly on the receiver, it is possible that a block of received frames may comprise out-of-order information. In this regard, one or more TCP segments within the received block may be missing. A missing TCP segment may be referred to as a hole. A summary of control information or data associated with the missing TCP segments or hole may also be stored or kept locally on the wireless network processor 110 or network system 50. This may provide for a flow-through architecture, which may require minimal resources on the wireless NIC or wireless network processor. In this regard, the wireless network processor may not be required to support a buffer for storing or buffering the out-of-order TCP segments and can use a resource efficient scalable memory to manage out-of-order TCP segments, as the out-of-order TCP segments may be placed or at least stored in a temporary buffer. In an aspect of the invention, a temporary buffer such as a FIFO or a host buffer may be utilized for temporarily buffering TCP segments. With this approach, the memory required for the data may not scale with number of connections, number of holes per connection or the TCP connection bandwidth delay product as would be typical of conventional systems. Accordingly, additional space may be allocated to accommodate the control data that scales with the number of holes and not with the number of TCP segments or frames that are out-of-order.

In accordance with an aspect of the invention, analysis of an exemplary TCP control plane state along with the information and the services that it may provide to its consumer, reveals that with slightly more accounting, a flow-through wireless or wireless network processor may support out-of-order TCP segments without utilizing an on-NIC data buffer for storing out-of-order TCP segments. A temporarily buffer such as a FIFO or other organization of on-chip memory may be utilized. Accordingly, out-of-order TCP segments may be sufficiently processed upon arrival to allow placement of data whenever the data adheres to the TCP rules or is properly rejected. In this regard, data may be properly rejected as being, for example, illegal or stale data. Illegal or stale data may comprise data that may have fallen outside or not received within the corresponding TCP window.

Figure 2A:
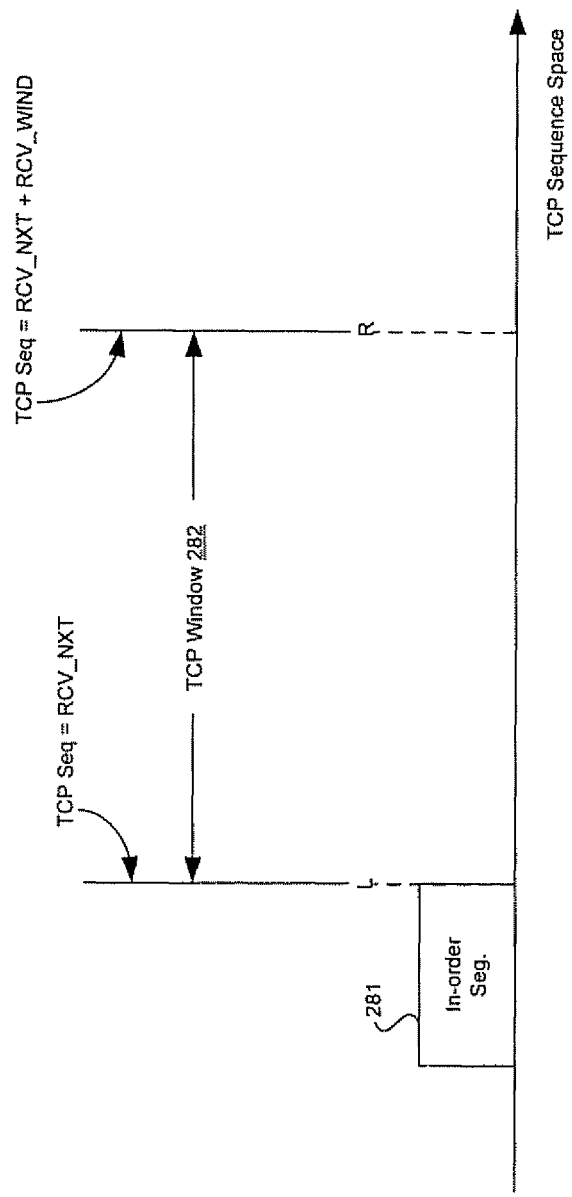
FIG. 2A is a block diagram of a received TCP segment within a TCP sequence space that may be utilized in connection with data placement of out-of-order TCP segments or frames, in accordance with an embodiment of the invention.

FIG. 2A is a block diagram of a received TCP segment within a TCP sequence space that may be utilized in connection with data placement of out-of-order TCP segments or frames in accordance with an embodiment of the invention. Referring to FIG. 2A, there is shown a received TCP segment 281 within a TCP sequence space and a TCP window 282. Data that is to the right of the left boundary, denoted L, of the TCP receive window (RCV.NXT) and to the left of the right edge, denoted R, of the window (RCV.NXT+RCV_WIND), may be received according to the TCP protocol.

Figure 2B:
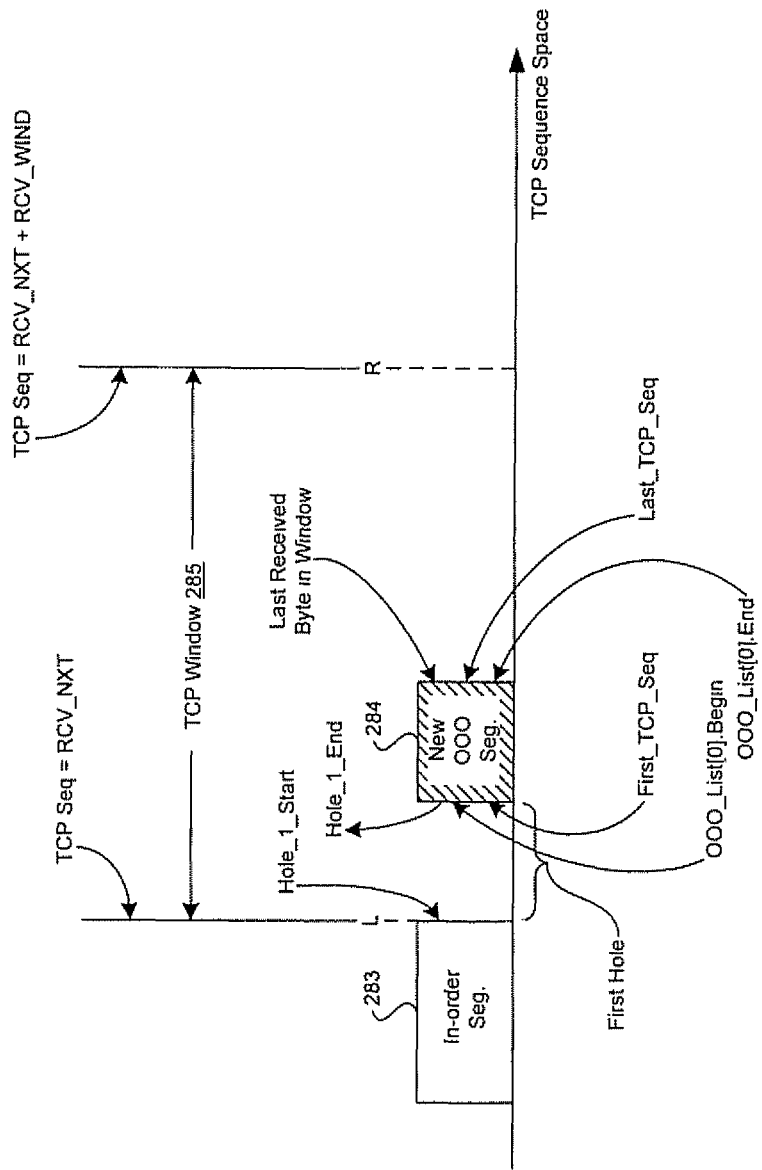
FIG. 2B is a block diagram of a newly received out-of-order TCP segment within a TCP sequence space that may be utilized in connection with data placement of out-of-order TCP segments or frames, in accordance with an embodiment of the invention.

FIG. 2B is a block diagram of a newly received out-of-order TCP segment within a TCP sequence space that may be utilized in connection with data placement of out-of-order TCP segments or frames in accordance with an embodiment of the invention. Referring to FIG. 2B, there is shown an in-order TCP segment 283, an out-of-order TCP segment 284 within a TCP sequence space and a TCP window 285.

In an exemplary embodiment of the invention, a newly received out-of-order TCP segment 284 creates a first hole lying between the in-order segment 283 and the newly received out-of-order TCP segment 284. The start of the first hole may be denoted by a variable, Hole_1_Start and the end of the first hole may be denoted by a variable Hole_1_End. The location of the leftmost portion of the newly received out-of-order TCP segment 284 may be assigned a variable First_TCP_Seq and the rightmost portion of the newly received out-of-order TCP segment 284 may be assigned a variable Last_TCP_Seq. The location of the leftmost portion of the newly received out-of-order TCP segment 284 may also be assigned a variable, for example, OOO_List[0].Begin, and the rightmost portion of the newly received out-of-order TCP segment 284 may also be assigned to a variable, for example, OOO_List[0].End. In general, the variable OOO_List[0].Begin and the variable OOO_List[0].End provides a list that may be utilized to track the out-of-order TCP segments. Accordingly, in an aspect of the invention, the list that may be utilized to track the out-of-order TCP segments may be implemented in an array. Moreover, the invention is not so limited and other data structures may be utilized without departing from the various aspects of the invention.

In instances where TCP segments are out-of-order, common TCP stacks running on a host processor or a dedicated wireless network interface card may either drop the TCP segments or buffer the TCP segments until the hole in the TCP sequence space is plugged. After plugging, the TCP segment or segments that were received as out-of-order TCP segments may be processed.

Notwithstanding, with a flow-through architecture, it may be desirable to have minimal or virtually no on-chip buffering for TCP processing of TCP segments. In this regard, TCP segments that may be valid may be processed and placed in host buffers as they are received from the network. The valid TCP segments are those segments that may fall inside a TCP window. In such a case, a receiver may acquire and/or monitor data associated with out-of-order TCP segments and keep an accounting of the TCP control space such that the hole can be plugged and duplicates prevented. For every hole in the TCP sequence space, the receiver may keep the TCP sequence number of its start and end points or start and length, for example. Another method is also illustrated in the pseudo code we use one way as an example). Any new TCP segment received thereafter may be checked to see if it is in-order, adjacent to a hole or is a new out-of-order TCP segment. The edges or boundaries of the holes may be moved accordingly. The reception process may follow the TCP protocol in which duplicate bytes are not received and data falling outside of the window is not received. For example, the variables First_TCP_seq and Last_TCP_Seq may be utilized to keep track of the first hole created by the placement of the new out-of-order segment 284 on the TCP sequence space of FIG. 2B

Figure 3:
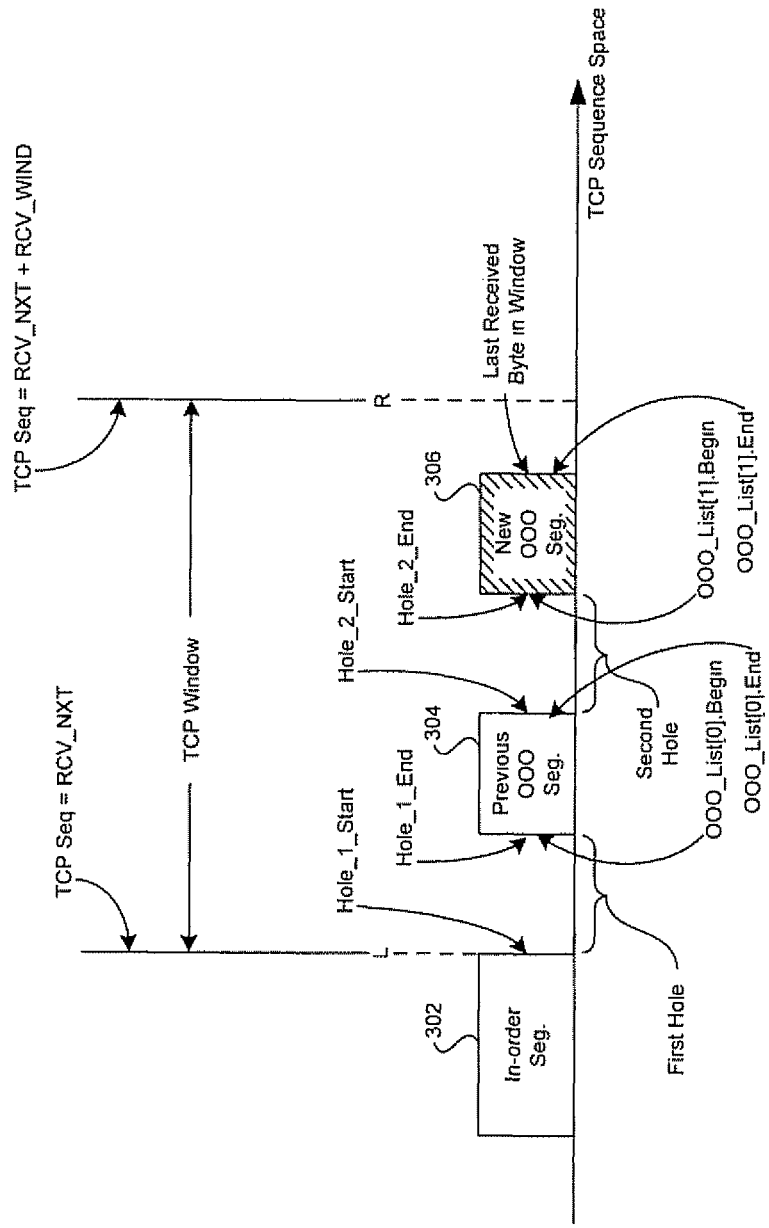
FIG. 3 is a block diagram of multiple received out-of-order TCP segments within a TCP sequence space that may be utilized in connection with data placement of out-of-order TCP segments or frames, in accordance with an embodiment of the invention.

FIG. 3 is a block diagram of multiple received out-of-order TCP segments within a TCP sequence space that may be utilized in connection with data placement of out-of-order TCP segments or frames in accordance with an embodiment of the invention. Referring to FIG. 3, there is shown an in-order TCP segment 302, a previous out-of-order TCP segment 304 and a new out-of-order TCP segment 306. The first hole is disposed between the in-order segment 302 and the previous out-of-order segment 304 as illustrated in FIG. 2B. Due to the placement of the new out-of-order TCP segment 306, the second hole is disposed between the previous out-of-order TCP segment 304 and the new out-of-order TCP segment 306. The start of the second hole may be denoted by, for example, the variable Hole_2_Start and the end of the second hole may be denoted by, for example, the variable Hole_2_End. The portion of the new out-of-order TCP segment 306 adjacent to the end of the second hole, Hole_2_End, may be assigned to a variable, for example, OOO_List[1].Begin. The end of segment 306 is assigned the variable OOO_List[1].End.

Figure 4:
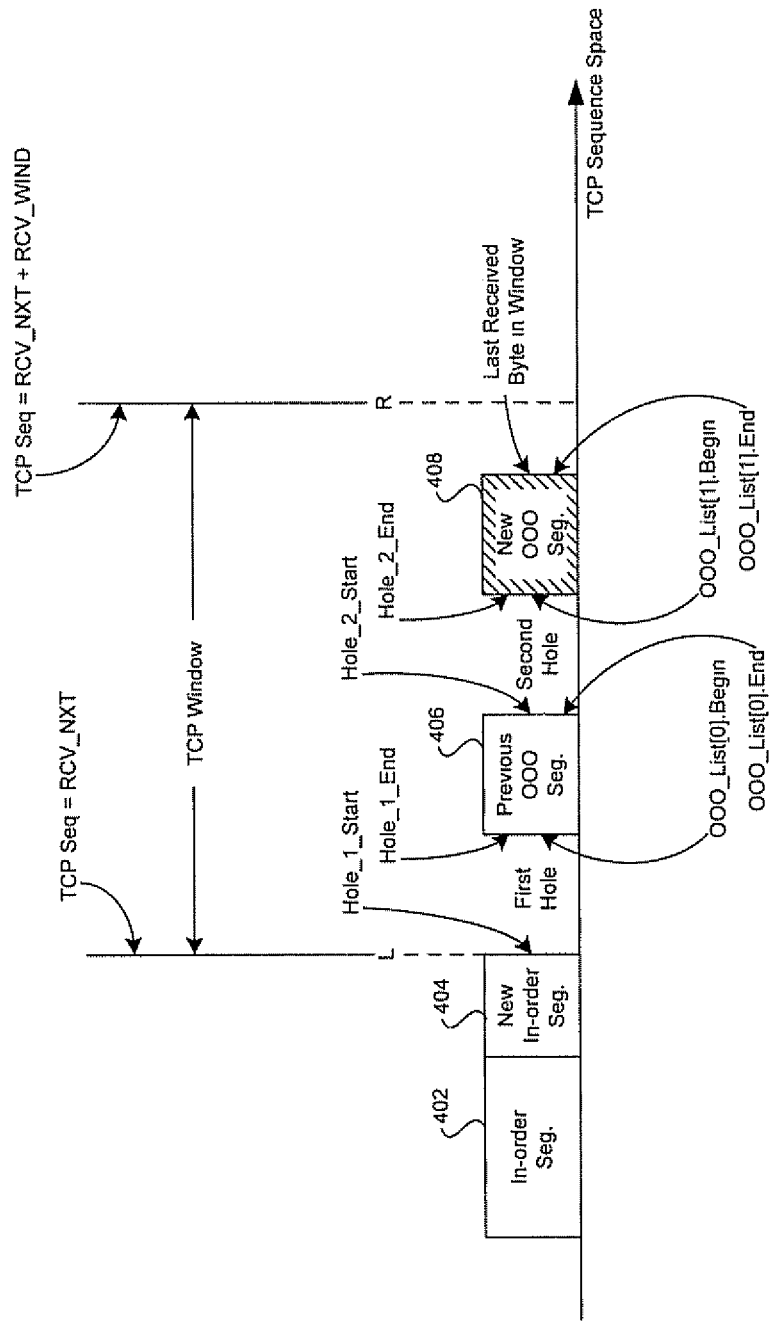
FIG. 4 is a block diagram of a newly received in-order TCP segment within a TCP sequence space that may be utilized in connection with data placement of out-of-order TCP segments or frames, in accordance with an embodiment of the invention.

FIG. 4 is a block diagram of a newly received in-order TCP segment within a TCP sequence space that may be utilized in connection with data placement of out-of-order TCP segments or frames in accordance with an embodiment of the invention. Referring to FIG. 4, there is shown an in-order TCP segment 404, a new in-order TCP segment, a previous out-of-order segment 406 and a new out-of-order segment 408, all of which are located within a TCP sequence space. The newly received in-order TCP segment 404 is adjacent to the in-order segment 402. In accordance with an aspect of the invention, because the new in-order TCP segment is in-order with respect to the in-order segment 402, the variables associated with the first hole and/or the second hole may not have to be modified. However the left edge of the TCP Window may be updated. Additionally, it may also cause an update to the right edge of the TCP window.

Figure 5:
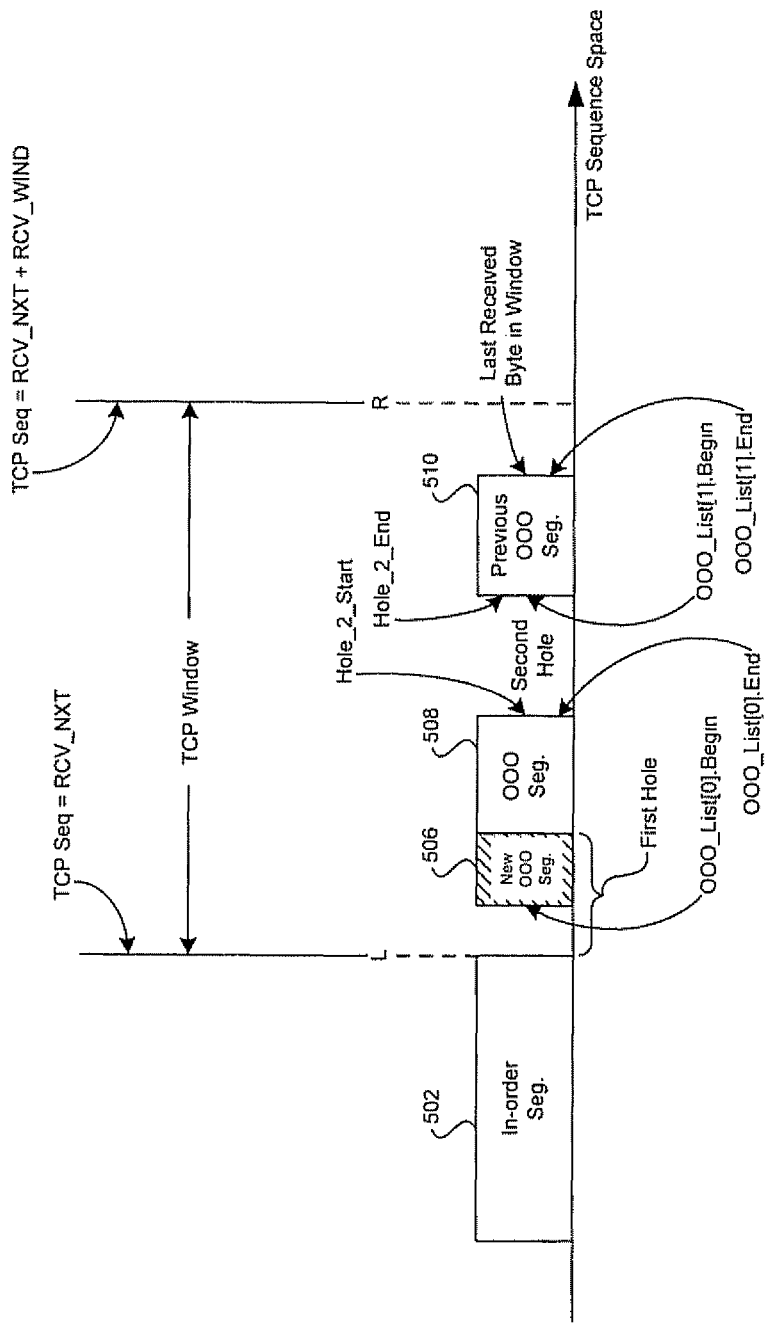
FIG. 5 is a block diagram of a newly received out-of-order TCP segment within a TCP sequence space that plugs a portion of a first hole and may be utilized in connection with data placement of out-of-order TCP segments or frames in accordance with an embodiment of the invention.

FIG. 5 is a block diagram of a newly received out-of-order TCP segment within a TCP sequence space that plugs a portion of a first hole and may be utilized in connection with data placement of out-of-order TCP segments or frames in accordance with an embodiment of the invention. Referring to FIG. 5, there is shown an in-order TCP segment 502, a new out-of-order segment 506, an out-of-order segment 508 and a previous out-of-order segment 510, all of which are located within a TCP sequence space.

The newly received out-of-order TCP segment 506 is adjacent to the out-of-order TCP segment 508 and plugs a portion of the first hole. Accordingly, in an aspect of the invention, since the new out-of-order TCP segment 506 plugs a portion of the first hole, the beginning of the variable OOO_List[0].Begin may be adjusted to reflect the placement of the new out-of-order TCP segment 506 adjacent to the out-of-order TCP segment 508. However, since the new out-of-order TCP segment 506 is adjacent to the out-of-order TCP segment 508, the variable OOO_List[1].End does not have to be modified. As new out-of-order frames are received, the first hole shrinks in size with no change in the amount of information that may be required for hole management.

Figure 6:
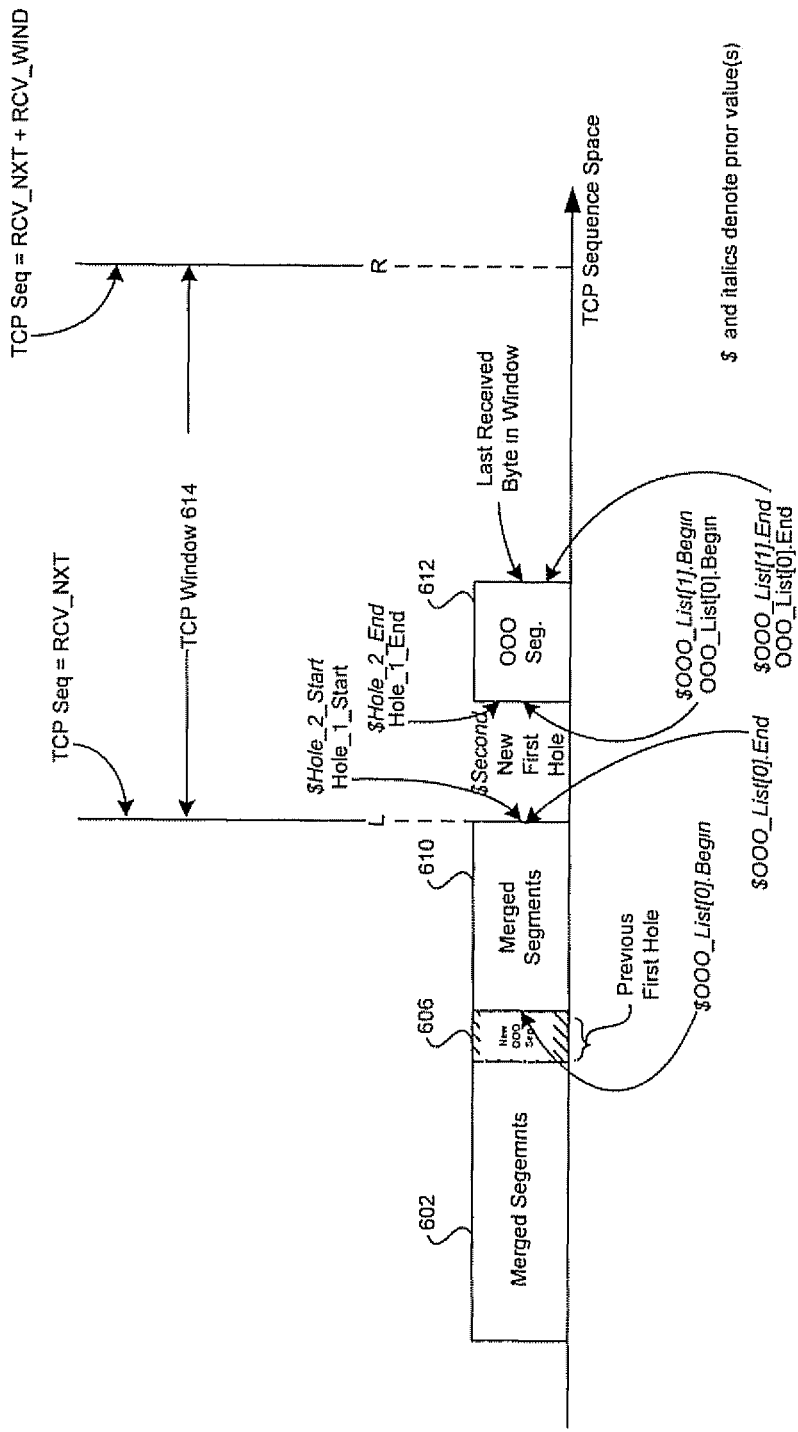
FIG. 6 is a block diagram of a newly received out-of-order TCP segment within a TCP sequence space that completely plugs a remaining portion of a first hole and may be utilized in connection with data placement of out-of-order TCP segments or frames, in accordance with an embodiment of the invention.

FIG. 6 is a block diagram of a newly received out-of-order TCP segment within a TCP sequence space that completely plugs a remaining portion of a first hole and may be utilized in connection with data placement of out-of-order TCP segments or frames in accordance with an embodiment of the invention. Referring to FIG. 6, there is shown a merged TCP segment 602, a new out-of-order TCP segment 606, a merged TCP segment 610 and a out-of-order TCP segment 612, all of which are located within a TCP sequence space. The newly received out-of-order TCP segment 606 is between both the merged TCP segment 602 and the merged TCP segment 610. In this regard, the new out-of-order TCP segment 606 plugs the remaining portion of the first hole.

Some ULPs, for example RDMA over TCP, are not gated by the hole in the TCP and full ULP processing may still be possible. For some ULPs, this may enable some ULP processing that was not possible when there was a hole in the TCP segments. This processing may be done on-chip or on a host. In either case, TCP payload placement may be done.

Subsequent to the plugging of the first hole, the second hole is designated at the new first hole and parameters associated with the second hole are designated as being associated with the new or current first hole. For example, the variable OOO_LIST[1].Begin previously associated with the second hole is adjusted or designated as the variable OOO_LIST[0].Begin The variable OOO_LIST[1].End previously associated with the second hole is adjusted and designated as the variable OOO_LIST[0].End. Finally, the start of the TCP window 614 shifts from the start of the previous first hole to the start of the new or current first hole. In this regard, the variable TCP Seq=RCV_NXT shifts in such a manner that the variable TCP Seq=RCV_NXT starts at the beginning of the new or current first hole and extends to the right in the TCP sequence space. The variable TCP Seq=RCV_NXT+REV_WIND may extend to the right by a value equivalent to the size TCP window 614, if additional buffers are available for the receiver and have been advertised to the remote peer by TCP protocol. In an aspect of the invention, as the new out-of-order frame completely plugs the first hole, less information required for hole management has to be stored. Accordingly, one of the hole descriptors can be removed and the left edge of the window moves to the right.

In general, new TCP segments or frames that are received and determined to be out-of-order may be utilized to shrink any of the holes in the TCP sequence number space they occupy that is adjacent to any existing hole. If the new frame plugs the space between two adjacent holes, then the holes are merged into one hole. Accordingly, with additional reference to FIG. 5, FIG. 6 indicates the merging of TCP segments when a hole is completely plugged by an out-of-order TCP segment. Additionally, FIG. 6 illustrates the shifting of the left edge of the TCP window 614 and optionally the right edge as well, when a hole is completely plugged. In this regard, with reference to FIG. 5 and FIG. 6, the leftmost edge of the TCP window 614 has shifted from the rightmost edge of the in-order TCP segment 502 (FIG. 5) to the rightmost edge of the previously out-of-order TCP segment 610 (FIG. 6), which is now the last in-order segment. The rightmost edge of the new in-order TCP segment 502 is synonymous to the merged TCP segment 602.

Figure 7A:
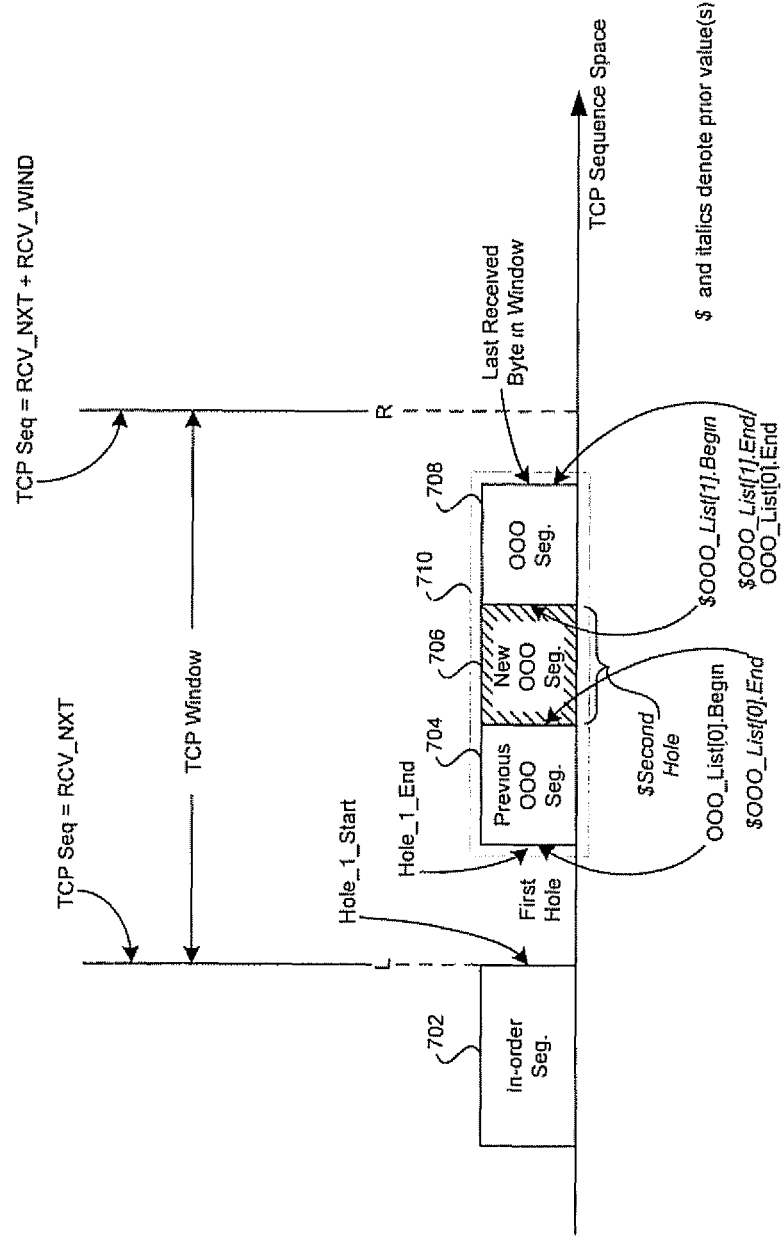
FIG. 7A is a block diagram of a newly received out-of-order TCP segment within a TCP sequence space that completely plugs a hole and may be utilized in connection with data placement of out-of-order TCP segments or frames, in accordance with an embodiment of the invention.

FIG. 7A is a block diagram of a newly received out-of-order TCP segment within a TCP sequence space that completely plugs a hole and may be utilized in connection with data placement of out-of-order TCP segments or frames in accordance with an embodiment of the invention. Referring to FIG. 7A, there is shown a first hole, a second hole, an in-order TCP segment 702, a previous out-of-order TCP segment 704, a new out-of-order TCP segment 706 and a previous out-of order TCP segment 708. In addition to FIG. 7A, FIG. 3 may also be utilized as a reference for the illustrations of FIG. 7A.

Accordingly, the first hole of FIG. 7A is disposed between the in-order segment 702 and the previous out-of-order segment 704. The second hole is disposed between the previous out-of-order segment 704 and the previous out-of-order segment 708. The new out-of-order TCP segment is adjacent to both the previous out-of-order segment 704 and the previous out-of-order segment 708. In this regard, the out-of-order segment 706 completely plugs the second hole. In an aspect of the invention, since the second hole is completely plugged, parameters associated with the second and/or first hole may be updated to reflect the absence of the second hole. For example, the variable OOO_LIST[1].Begin previously associated with the second hole is no longer required since the second hole no longer exist. The variable OOO_LIST[0].End previously associated with the end first hole holds an obsolete value since the right edge of the hole is represented by the variable OOO_List[1].End. Hence, the value represented by variable OOO_List[1].End is now copied to the variable OOO_List[0].End. Finally, since there is no longer a second hole, the variable OOO_LIST[1].End may be removed. Accordingly, the three (3) consecutive TCP segments 704, 706 and 708 may have corresponding variables OOO_LIST[0].Begin and OOO_LIST[0].End, with variable OOO_LIST[0]. Begin representing the leftmost portion of the previous out-of-order segment 704 and variable OOO_LIST[0].End representing the rightmost portion of out-of-order segment 708. From another perspective, the three (3) consecutive TCP segments 704, 706 and 708 may be regarded as a single out-of-order TCP segment 710 having corresponding variables OOO_LIST[0].Begin and OOO_LIST[0].End. Although new segments can partially or completely overlap one or more previously received segments, for simplicity this is not illustrated. However, such scenarios are covered in the pseudo code that follows.

In accordance with an embodiment of the invention, the flow-through wireless network processor may manage as many holes inside the TCP receive window, as may be desirable. The optimal number of the holes the flow-through wireless network processor may support may be dependent upon, for example, a typical drop syndrome associated a particular connection. For example, the connection may be a WAN connection where the drop may be due mainly to router congestion yielding potentially many holes in a large window. The connection may also be a LAN connection having, for example, a single drop due a switch and in this case, link-by-link flow control or congestion avoidance may take some time to start functioning.

As the type of drops such as the number of holes and number of segments or frames in a hole may vary, a programmable number of holes may be utilized. Each hole may require state variables that may be utilized to keep its start and end points. In case the flow-through wireless network processor supports a upper layer protocol (ULP) on top of TCP, more state variables may be needed per hole. Upper layer protocol specific activities may be required once a hole is plugged and the receiver acquires more information regarding the behavior expected by the upper layer protocol in the TCP control plane. For example, the upper layer protocol may be notified of the completion of a message. However, in such a scenario, the basic separation between data and control plane may allow a flow-through wireless network processor to accomplish placement with virtually no buffering of data or no buffering of out-of-order TCP segments.

In an embodiment of the invention, placement of data may be performed by mapping the TCP sequence space to the buffer space. In this regard, the buffer space may be viewed as a linear space. Accordingly, the first byte of the buffer may correspond to a particular TCP sequence value within the TCP sequence space. Accordingly, any other byte in the TCP segment may be placed at an offset in the buffer that may correspond to its delta or offset in the TCP sequence space as compared with the sequence value for the first byte. In other words, a starting address or location of a first byte of a TCP segment or TCP frame may operate as a reference point and any other byte may be located as an offset from the first byte in the TCP sequence space. In another aspect of the invention, there may be a upper layer protocol specific translation that may be utilized to map certain ranges of the TCP sequence numbers to specific buffer areas in a buffer space. Notwithstanding, this may not alter the basic mapping presented in accordance with the various aspects of the invention.

Figure 7B:
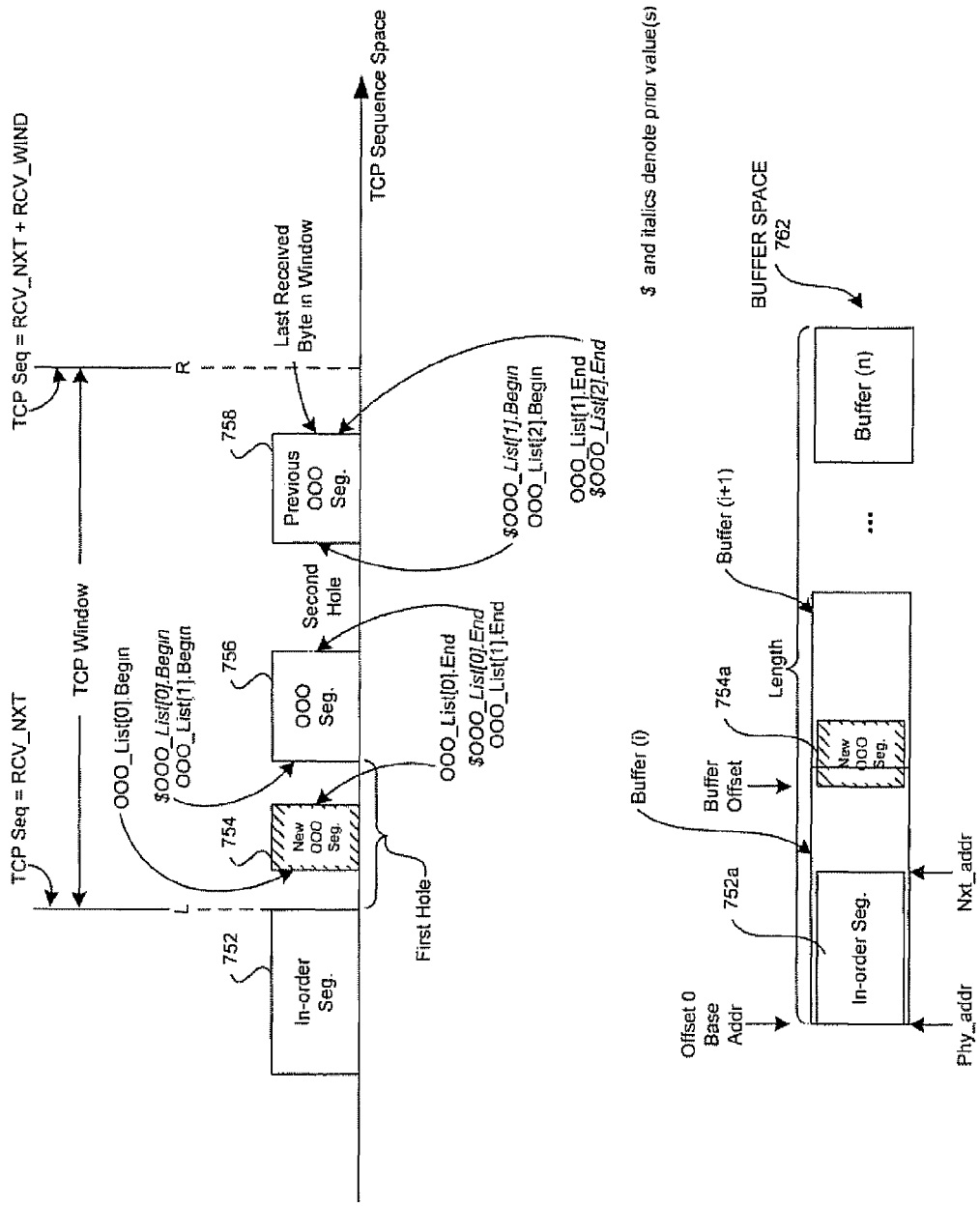
FIG. 7B is a block diagram of exemplary updated variables, in accordance with an aspect of the invention.

FIG. 7B is a block diagram that illustrates exemplary updated variables in accordance with an aspect of the invention. Referring to FIG. 7B, there is shown an in-order segment 752, a new out-of-order segment 754, an out-of-order segment 756, a previous out-of-order segment 758. Also illustrated in FIG. 7B is buffer space 762 is the in-order segment 752a and the new out-of order segment 754a. The new out-of-order segment 754a spans a first buffer (i) and a consecutive buffer (i+1) The buffer space 762 has a buffer length L and may be segmented into buffers (i), buffer (I+1), . . . , buffer (n). The buffer space 762 has a base address (Phy_addr), which is at offset 0, for example. The base address may be any physical address and for convenience, may be designated as offset zero (0). In its current state, the in-order TCP segment is posted with the buffer space 762 starting at the base address, offset zero (0). The variable Nxt_addr denotes the next address where data is to be posted within the buffer space 762 and in this instance, is one byte beyond the end of the in-order TCP segment 752a. In accordance with an embodiment of the invention, a received out-of-order TCP segment may span multiple buffers in the buffer space 762. For example, a received out-of-order TCP segment may span buffer (i) and buffer (i+1). The buffer length may be at least equal to the TCP window size.

With reference to FIG. 7b, in order to reflect the changes, the newly received out-of-order TCP segment 754 becomes the first member in the list of out-of-order TCP segments and its associated variables may be updated accordingly. In a somewhat similar manner, variables associated with the out-of-order TCP segment 756 may also be updated to reflect the fact that out-of-order TCP segment 756 is the second member in the list of out-of-order TCP segments. Previously, the out-of-order TCP segment 756 was the first TCP segment in the list of out-of-order TCP segments. Finally, the out-of-order TCP segment 758 becomes the third member in the list of out-of-order TCP segments and it associated variables may be updated accordingly. Previously, the out-of-order TCP segment 758 was the second out-of-order TCP segment in the list of out-of-order TCP segments. The following table illustrates the previous and updated variables for the newly received out-of-order TCP segment 758, the out-of-order TCP segment 756 and the out-of-order TCP segment 758.

| Variable | Previous Value | Current Value |
| --- | --- | --- |
| New OOO Segment 754 | — | OOO_List[0].Begin |
|  | — | OOO_List[0].End |
| OOO Segment 756 | OOO_List[0].Begin | OOO_List[1].Begin |
|  | OOO_List[0].End | OOO_List[1].End |
| OOO Segment 758 | OOO_List[1].Begin | OOO_List[2].Begin |
|  | OOO_List[1].End | OOO_List[2].End |

Figure 8:
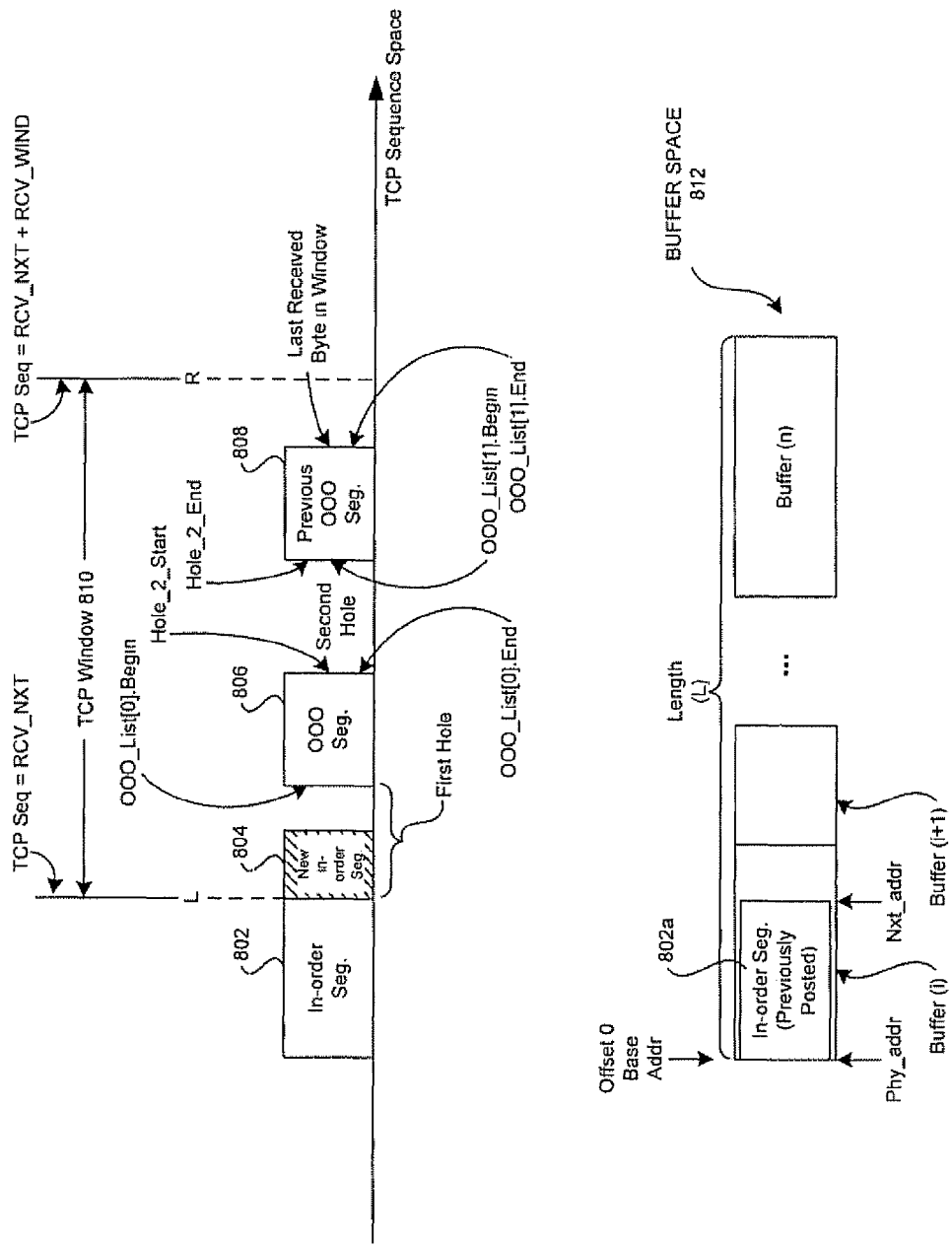
FIG. 8 is a block diagram of a newly received in-order TCP segment within a TCP sequence space and states of exemplary variables and buffers prior to posting that may be utilized in connection with data placement of out-of-order TCP segments or frames, in accordance with an embodiment of the invention.

FIG. 8 is a block diagram of a newly received in-order TCP segment within a TCP sequence space and states of exemplary variables and buffers prior to posting that may be utilized in connection with data placement of out-of-order TCP segments or frames in accordance with an embodiment of the invention. Exemplary variables utilized to control the TCP state and the buffer space when data is received in order are illustrated in FIG. 8. These variables are utilized in the pseudo code set forth below. Referring to FIG. 8, there is shown an in-order TCP segment 802, a new in-order TCP segment 804, an out-of-order segment 806, an out-of-order segment 808 and TCP window 810, all of which are located within a TCP sequence space. The newly received in-order TCP segment 804 may be situated adjacent to the in-order segment 802, plugs a leftmost edge of the first hole and aligns with the left edge of the TCP window 810. Accordingly, in an aspect of the invention, the leftmost edge of the out-of-order TCP segment 806 may be assigned the variable OOO_List[0].Begin and the rightmost edge of the out-of-order TCP segment 806 may be assigned the variable OOO_List[0].End. In a somewhat similar manner, the leftmost edge of the previous out-of-order TCP segment 808 may be assigned the variable OOO_List[1].Begin and the rightmost edge of the out-of-order TCP segment 808 may be assigned the variable OOO_List[1].End.

Also shown in FIG. 8 is a corresponding buffer space 812 and an in-order TCP segment 802a. The buffer space 812 has a buffer length L and may be segmented into buffers (i), buffer (I+1), . . . , buffer (n). The in-order TCP segment 802a corresponds to the in-order TCP segment 802 within the TCP sequence space. The buffer space 812 has a base address (Phy_addr), which is at offset 0, for example. The base address may be any physical address and for convenience, may be designated as offset zero (0). In its current state, the in-order TCP segment is posted with the buffer space 812 starting at the base address, offset zero (0). The variable Nxt_addr denotes the next address where data is to be posted within the buffer space 812 and in this instance, is one byte beyond the end of the in-order TCP segment 802a. In accordance with an embodiment of the invention, a received out-of-order TCP segment may span multiple buffers in the buffer space 812. For example, a received out-of-order TCP segment may span buffer (i) and buffer (I+1). The received out-of-order TCP segment may also span multiple TCP segments. The buffer length may be at least equal to the TCP window size.

Figure 9:
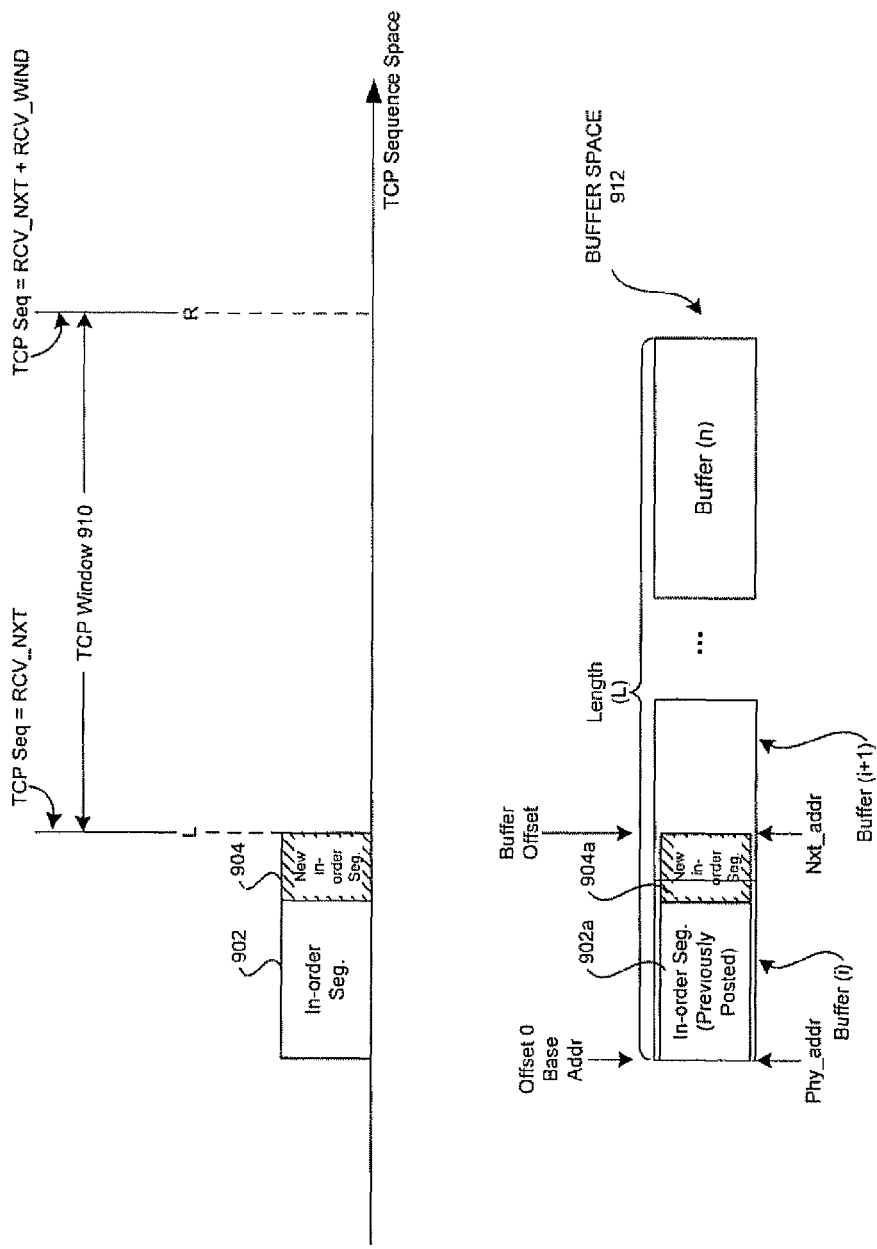
FIG. 9 is a block diagram of a newly received in-order TCP segment within a TCP sequence space and depicts various states of exemplary variables and buffers subsequent to posting and may be utilized, in connection with data placement of out-of-order TCP segments or frames in accordance with an embodiment of the invention.

FIG. 9 is a block diagram of a newly received in-order TCP segment within a TCP sequence space and depicts various states of exemplary variables and buffers subsequent to posting and may be utilized in connection with data placement of in-order or out-of-order TCP segments or frames in accordance with an embodiment of the invention. The exemplary variables of FIG. 8 that are utilized to control the TCP state and the buffer space when data is received in order are also illustrated in FIG. 9.

Referring to FIG. 9, there is shown an in-order TCP segment 902, a new in-order TCP segment 904, and TCP window 910, all of which are located within a TCP sequence space. The newly received in-order TCP segment 904 is placed adjacent to the in-order segment 902, plugs a leftmost edge of the first hole and aligns with the left edge of the TCP window 910.

In an aspect of the invention, since the newly received TCP segment 904 is in-order, the newly received TCP segment 904 may be placed adjacent to the in-order TCP segment 902. Accordingly, the TCP window 910 is adjusted so that the rightmost edge of the new in-order TCP segment 904 becomes the leftmost edge of the TCP window 910. In this regard, the window slides from the rightmost edge of the in-order TCP segment 902 to the rightmost edge of the in-order TCP segment 904.

Also shown in FIG. 9 is a corresponding buffer space 912 of buffer length L, an in-order TCP segment 902a and a newly received in-order TCP segment 904a. The in-order TCP segment 902a corresponds to the in-order TCP segment 902 and the TCP segment 904a corresponds to the newly received in-order TCP segment 904. In this regard, the in-order TCP segment 902a may be referred to as a previously posted in-order TCP segment. The buffer space 912 has a base address (Phy_addr), which is at offset 0, for example. In its current state, the new in-order TCP segment 904a may be posted adjacent to the previously posted in-order TCP segment 902a starting at the location Nxt_addr as depicted in FIG. 8. Since the newly received in-order TCP segment 904a is placed adjacent to the in-order TCP segment 902a, then, in this case, after data is posted the next address (Nxt_addr) and the buffer offset are located at the rightmost edge of the newly received in-order TCP segment 904a. The next received in-order segment will be posted at Nxt_addr, which in this case, denotes the end of the in-order TCP segments in the buffer space 912. In an aspect of the invention, the new in-order TCP segment 904a spans multiple buffers including buffer (i) and buffer (I+1) in the buffer space 912. The other instances, the new in-order TCP segment 904a may span multiple TCP segments. Now that buffer (i) is completely full, buffer (i) may be completed to the ULP, the application or whoever provided the buffer to begin with.

Figure 10:
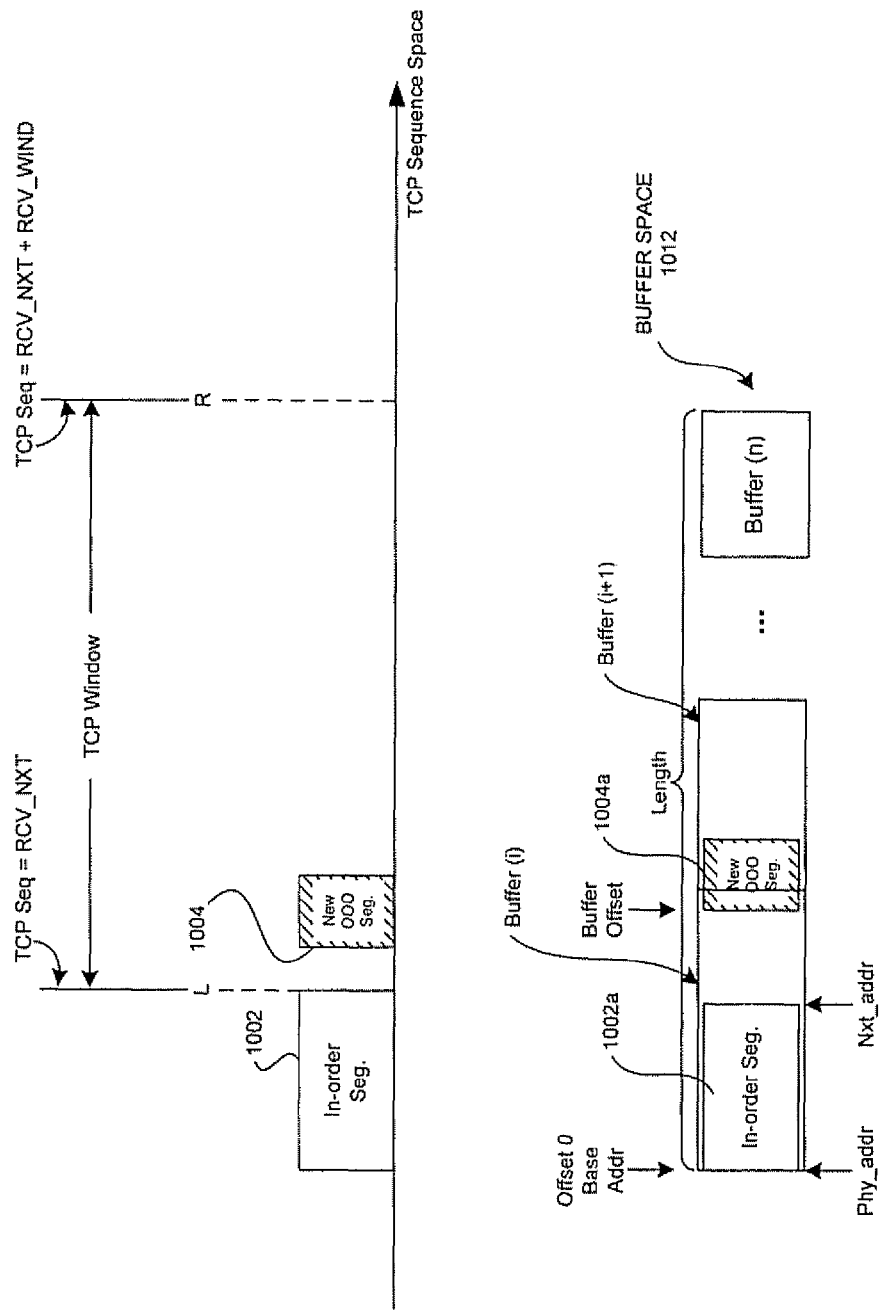
FIG. 10 is an exemplary diagram illustrating processing of a newly received in-order TCP segment within a TCP sequence space and states of exemplary variables and buffers subsequent to posting that may be utilized in connection with data placement of out-of-order TCP segments or frames, in accordance with an embodiment of the invention.

FIG. 10 is an exemplary diagram illustrating processing of a newly received out-of-order TCP segment within a TCP sequence space and its buffering in connection with data placement of out-of-order TCP segments or frames in accordance with an embodiment of the invention. Referring to FIG. 10, there is shown an in-order TCP segment 1002 and a new out-of-order TCP segment 1004. The in-order TCP segment 1002a in the buffer space 1012 maps to the in-order TCP segment 1002 in the TCP sequence space. In a somewhat similar manner, the newly received out-of-order TCP segment 1004a in the buffer space 1012 maps to the out-of-order TCP segment 1004 in the TCP sequence space. The exemplary variables of FIG. 8 that are utilized to control the TCP state and the buffer space, when data is received in order, is also illustrated in FIG. 10. Referring to FIG. 10, there is shown an in-order TCP segment 1002, a new out-of-order TCP segment 1004, all of which are located within a TCP sequence space. The newly received out-of-order TCP segment 1004 is situated within a portion of the first hole.

FIG. 10 also includes a corresponding buffer space 1012 of buffer length L, an in-order TCP segment 1002a and a newly received out-of-order TCP segment 1004a. The in-order TCP segment 1002a corresponds to the in-order TCP segment 1002 and the newly received in-order TCP segment 1004a corresponds to the newly received in-order TCP segment 1004. The buffer space 1012 has a base address (Phy_addr), which is at offset 0, for example. In its current state, the newly received in-order TCP segment 1004a is posted starting at a location designated as buffer offset. In this regard, the newly received in-order TCP segment is not placed at the Nxt_addr since it is not an in-order TCP segment. In a case where a new in-order TCP segment is received, it is posted adjacent to the in-order TCP segment 1002a starting at Nxt_addr. Instead, it may be placed in an offset that is equivalent to the data in the TCP space. This TCP sequence space delta, may be utilized to compute the offset in the buffer.

In accordance with an embodiment of the invention, it may be assumed that the host provides enough buffers such that the total length of the buffer is always greater than or equal to the TCP Window size. However, in instances where the buffers provided by TCP, ULP or the application are not large enough, then the receiver may decide not to accept out-of-order TCP segments that it has no buffer for. In this regard, the receiver will drop those out-of-order segments. Another option for the receiver is to use other buffers provided to it by its drivers, TCP or any other entity, as a temporary storage for the data and later on, copy it to the posted buffer. Accordingly, the process may take place in either buffer posted by TCP, by the ULP, by the driver, by any other entity, or any combination thereof. For example, placement may start in a temporary buffer provided by the driver and continue in a ULP submitted buffer. Subsequently, the content placed in the buffers provided by the driver may be copied by hardware or any software entity such as a driver, communication stack, and/or middleware to the designated buffer.

In accordance with another embodiment of the invention, the pseudo code below illustrates an exemplary process that may be utilized to move data from a TCP segment to a buffer list. For simplicity, the pseudo code that covers the handling a PUSH bit or the "no room in current buffer list" is omitted. However, omission of the pseudo code is not intended to limit the invention. Also, the pseudo code assumes a static TCP situation with no receive TCP window update. However, adding code may be done without detracting from the various embodiments of the invention. Additionally, wrap around of the TCP sequence number space is not included in pseudo code. The pseudo code also assumes that no other frame is handled while a current frame is handled. In this regard, the pseudo-code assumes that interrupts are disabled. The pseudo code is as follows:

```
/* global initializations */
Number_of_holes = 0;
OOO_Data {
  Begin Int32;
  End Int32;
  ULP_Event_present Boolean;         /* Variable keeps tag of presence
of ULP event in OOO segment */
  ULP_Event_TCP_Sequence_number Int32; /* TCP sequence number for
ULP event */
} OOO_list[I]; /* this list of structure keeps tag of TCP seq number of
segments received o-o-o. Create list of maximal number of holes supported
and init all variables to zero*/
/* RCV_NXT is the TCP sequence number of next byte expected to be
received */
1.      /* The TCP Sequence number range (TCP Seq # of the first byte of
TCP payload is First_TCP_Seq, TCP Sequence # of last byte is
Last_TCP_Seq) is checked to be within RCV window (between RCV_NXT
and RCV_NXT + RCV_Window) */
1A.     /* If frame outside the window (stale or duplicate) drop the frame */
  if ((First_TCP_Seq > (RCV_NXT + RCV_window)) || (Last_TCP_Seq <
RCV_NXT)) then drop_frame( );
1B. /* If some bytes have been received before, ignore duplicate bytes */
  if First_TCP_Seq < RCV_NXT then First_TCP_Seq = RCV_NXT;
1C.     /* In case some bytes are out of the window, the receiver may drop
the whole segment. Here the receiver drops the illegal bytes only */
if Last_TCP_Seq > (RCV_NXT + RCV_window) then Last_TCP_Seq =
(RCV_NXT + RCV_window);
1D.     /* In case last data is o-o-o; do accounting. It may be a new hole or
plug a hole or be adjacent to a hole */
  if First_TCP_Seq > RCV_NXT then Number_of_holes = Hole_accounting( );
1E. /* In case last data is in-order, it may plug a hole */
  if (First_TCP_Seq == RCV_NXT) RCV_NXT = Last_TCP_Seq + 1; /*
update of the RCV_Window is outside the scope of this code */
    {
        if ((Number_of_Holes > 0) && (Last_TCP_Seq +1 ==
OOO_list[1].Begin)) then
        {
        /* removes element 1, index of following elements reduced by one */
Remove_OOO_list_element(1);
Number_of_Holes--;
        }
    }
2.      /* Find the right entry in the buffer list. Placement is oblivious to the
in-order, out-of-order or part of a hole issue */
Segment_Length = Last_TCP_Seq - First_TCP_Seq;
/* TCP_Delta holds the difference in the TCP sequence number to the
location first byte of the frame. It is also the distance in the buffer space to
the first byte that ought to used to store it */
TCP_Delta = (First_TCP_Seq - RCV_NXT) /* delta from anchor in TCP
space */
i=0;             /* used to dynamically point to the buffer that corresponds
to RCV_NXT */
/* Some bytes of Host_Buffer_List.Buffer[0] may have been used already.
Need to figure out how many are left */
if (TCP_Delta < (Host_Buffer_List.Buffer[0].length -
(Host_Buffer_List.Buffer[0].NXT_Addr -
Host_Buffer_List.Buffer[0].Phy_Addr)))
{
  Buffer_Offset = TCP_Delta + (Host_Buffer_List.Buffer[0].NXT_Addr -
Host_Buffer_List.Buffer[0].Phy_Addr);
}
else
{
Buffer_Offset = TCP_Delta - (Host_Buffer_List.Buffer[0].length -
(Host_Buffer_List.Buffer[0].NXT_Addr -
```

```
Host_Buffer_List.Buffer[0].Phy_Addr));
i = 1;
 Do while { Buffer_Offset - (Host_Buffer_List.Buffer[i].length > 0}
{
      Buffer_Offset -= Host_Buffer_List.Buffer[i].length;
i++;
}
i--;
}
 /* The variable i point to the i-th buffer after the first buffer, where data
posting should start at. Buffer_Offset holds the offset into this buffer */
3.       /* DMA into first buffer, syntax of DMA_Data (from address, to
address, length)
     First buffer is special as placement can start anywhere inside the
buffer */
DMA_Data (@First_TCP_Seq, Host_Buffer_List.Buffer[i].Phy_Address+
Buffer_Offset, Min((Host_Buffer_List.Buffer[i].length-Buffer_Offset),
Segment_Length)) ;
5. /* Complete first buffer to ULP in case data is in order right at first
available byte in buffer AND the buffer is full now AND there are no holes in it
and all buffers preceding it (i.e. with data corresponding to lower TCP
sequence numbers) have been completed to the ULP. Note first buffer
contains the left edge of the TCP window i.e. in-order TCP data */
if ( i == 0 &&
(Buffer_Offset == Host_Buffer_List.Buffer[0].NXT_Addr) &&
Segment_Length >= (Host_Buffer_List.Buffer[0].length -
(Host_Buffer_List.Buffer[0].NXT_Addr -
Host_Buffer_List.Buffer[0].Phy_Addr))         &&
(OOO_list[0].Begin > 0)              &&
(OOO_list[0].Begin > (First_TCP_Seq +
Min((Host_Buffer_List.Buffer[0].length-Buffer_Offset), Segment_Length))
  {
indicate_buffer_to_ULP(Host_Buffer_List.Buffer[0]);
remove_buffer_from _list (Host_Buffer_List.Buffer[0]); /* following buffer is
now the first */
 }
6.       /* maintain TCP variables. For simplicity will handle RCV_NXT only. It
gets incremented in case data is in order AND a buffer is available */
if ( TCP_Delta == 0) RCV_NXT += Segment_Length;
7. /* handle next buffers (for simplicity skip checks for buffer availability).
Introduce temp variables Bytes_to_DMA and Start_TCP_Seq. Note i points
to the buffer following the 1st buffer data has been stored in. In case of in-
order receive, if first buffer (i=0) has been completed and there are more
bytes to be stored, i=0 again but points to the buffer that originally was 2nd */
  Bytes_to_DMA = Segment_Length - Min((Host_Buffer_List.Buffer[i].length-
Buffer_Offset), Segment_Length); /* bytes that have been DMA'd into 1st
buffer */
  Start_TCP_Seq = First_TCP_Seq + Min((Host_Buffer_List.Buffer[i].length-
Buffer_Offset), Segment_Length);
8. /* DMA into next buffers if needed */
 Do while { Bytes_to_DMA > 0}
 {
     DMA data (@Start_TCP_Seq,
Host_Buffer_List.Buffer[i].Phy_Address,
Min((Host_Buffer_List.Buffer[i].length, Bytes_to_DMA)
     Bytes_to_DMA -= Min((Host_Buffer_List.Buffer[i].length,
Bytes_to_DMA;
     Start_TCP_Seq += Min((Host_Buffer_List.Buffer[i].length,
Bytes_to_DMA
    i++;
      If i > max_buffers then no_more_buffers( ); /* exit no buffers
available */
 }
9.
/* Routine for accounting for in-window TCP data that is received out-of-
order. Builds o-o-o data management structures, returns number of holes */
int32
Hole_accounting( )
{
 /* check for no duplicate of o-o-o data. Data can re-write it in buffer (as
content is guaranteed by TCP to be identical) or to save DMA cycles can
write into buffer just the receive data that has not been previously received).
Below just new data is being written to buffer (except for case where new
frame fully overlaps existing hole from both ends */
I = 0;
Do while ( Number_of_Holes > I )
{
 /* For simplicity of the pseudo code the case where one TCP segment
overlaps more than one hole is not discussed here. However it is a simple
```

-continued

```
extrapolation of the code below */
    /* if new hole on left side of element I, allocate space to manage it */
    If ((Last_TCP_Seq+1) < OOO_list[I].Begin) then
    {
      /* insert element I before original element I, push original I and
subsequent elements 1 up */
        Insert_OOO_list_element(I);
        OOO_list[I].Begin = First_TCP_Seq;
        OOO_list[I].End = Last_TCP_Seq;
        return (Number_of_Holes++);
    }
    If ((Last_TCP_Seq+1) == OOO_list[I].Begin)) then OOO_list[I].Begin =
First_TCP_Seq;
    Else If ((First_TCP_Seq < (OOO_list[I].Begin) && (Last_TCP_Seq >
(OOO_list[I].Begin) && (Last_TCP_Seq <= (OOO_list[I].End)) then
Last_TCP_seq = (OOO_list[I].Begin
    Else If ((First_TCP_Seq >= (OOO_list[I].Begin) && (Last_TCP_Seq <=
(OOO_list[I].End)) then drop_frame( );
    Else If ((First_TCP_Seq >= (OOO_list[I].Begin) && (First_TCP_Seq <
(OOO_list[I].End) && (Last_TCP_Seq > (OOO_list[I].End) then
First_TCP_seq = (OOO_list[I].End
    /* Is this data adjacent to existing hole from right? Move edge of hole. Is the
hole plugged now? */
        If ((First_TCP_Seq == OOO_list[I].End+1)    then OOO_list[I].End
= Last_TCP_Seq;
        If ((OOO_list[I].End +1) == OOO_list[I+1].Begin) then
        {
        OOO_list[I].End = OOO_list[I+1].End;
        /* removes element I+1, (reset to zero its variables) index of following
elements reduced by one */
        Remove_OOO_list_element(I+1);
        return (Number_of_Holes--);
        }
        /* Is the hole plugged now from left? */
        If (OOO_list[I].Begin == OOO_list[I-1].End +1) then
        {
          OOO_list[I-1].End = OOO_list[I].End;
        /* removes element I, index of following elements reduced by one */
        Remove_OOO_list_element(I);
        return (Number_of_Holes--);
        }
        /* if new hole on right side of element I, allocate space to manage it */
        If ((First_TCP_Seq+1) > OOO_list[I].End) && (Last_TCP_Seq <
OOO_list[I+1])) then
        {
          /* insert element I+1 after original element I, push original I+1 and
subsequent elements 1 up */
          Insert_OOO_list_element(I+1);
          OOO_list[I+1].Begin = First_TCP_Seq;
          OOO_list[I+1].End = Last_TCP_Seq;
          return (Number_of_Holes++);
        }
        I++;
  }
}
```

Another embodiment of the invention may provide a machine-readable storage, having stored thereon, a computer program having at least one code section for providing data handling out-of-order TCP segments in a wireless system. The at least one code section may be executable by a machine, thereby causing the machine to perform the steps as described herein for handling of the out-of-order (OOO) TCP segments.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
at a wireless network processor,
receiving data defining transmission control protocol (TCP) segments at the wireless network processor;
parsing the received TCP segments into corresponding TCP header segments and corresponding TCP data segments;
identifying established end-to-end TCP/IP connections established by the wireless network processor;
associating the received TCP segments with an identified end-to-end TCP/IP connection of the wireless network processor using the TCP header segments;
retrieving stored connection state information for the identified end-to-end TCP/IP connection;
directing data movement of the TCP data segments according to the retrieved connection state information and direction information of the TCP header segments, including:
storing data defining the corresponding TCP header segments in a first portion of a host buffer;
storing data defining the corresponding TCP data segments in a second portion of the host buffer;
determining whether a current received TCP segment is an in-order TCP segment or an out-of-order TCP segment with respect to previously received TCP segments; and
when the current received TCP segment is an out-of-order TCP segment:
storing data defining control information associated with the out-of-order TCP segment; and
using the stored control information, placing data defining the out-of-order TCP segment in the corresponding portions of the host buffer so that the out-of-order TCP segment is in order with respect to one or more previously received TCP segments; and
recording TCP segment data indicating one or both of
a starting address of the placed data defining the out-of-order TCP segment and an ending address of the placed data defining the out-of-order TCP segment, and
a start buffer address of the placed data defining the out-of-order TCP segment plus information about length of the placed data defining the out-of-order TCP segment, and
recording control information associated with the recorded TCP segment data.

2. The method of claim 1 further comprising:
if the current received TCP segment is an in-order TCP segment, placing data defining the in-order TCP segment in the corresponding portions of the host buffer adjacent to data defining the previously received TCP segments in the corresponding portions of the host buffer.

3. The method of claim 2 further comprising:
recording a buffer address occupied by an end of the previously received TCP segments; and
placing the data defining the in-order TCP segment starting from an address in the corresponding portions of the host buffer adjacent to the recorded buffer address occupied by the end of the previously received TCP segments in the corresponding portions of the host buffer.

4. The method of claim 1 further comprising:
at the wireless network processor,
computing a buffer address for location of a first byte of data for the previously received TCP segments;
computing a buffer address for a first byte of data in the current received TCP segment using a buffer address that corresponds to a TCP segment number of a second received TCP segment; and
computing an offset from a TCP segment number that corresponds to a first TCP segment to a first byte of the current received TCP segment.

5. The method of claim 4 further comprising:
at the wireless network processor,
determining whether the computed offset is larger than a length of the first buffer;
if the computed offset is larger than the length of the first buffer, subtracting the length of the first buffer from the computed offset to determine in a new offset;
subtracting a length of a second buffer from the new offset; and
if subtraction of the length of the second buffer results in the new offset being less than a length of the second buffer, storing data for the current received TCP segment in the first buffer and the second buffer.

6. The method of claim 5 further comprising:
at the wireless network processor,
if the new offset is greater than a length of the second buffer, subtracting a length of other buffers until the buffers are exhausted or a remaining offset is less than a length of a current buffer.

7. The method of claim 6 further comprising:
at the wireless network processor,
if a remaining offset is less than a length of the current buffer, storing data for the current received TCP segment in the second buffer and other buffers.

8. The method of claim 7 further comprising:
at the wireless network processor,
if the buffers are exhausted, dropping the current TCP segment.

9. The method of claim 1 further comprising:
at the wireless network processor,
defining a TCP window among storage of the host buffer;
adjusting the TCP window to an end of a last in-order received TCP segment upon placement of the data defining the previously received TCP segments in the corresponding portions of the host buffer.

10. The method of claim 9 further comprising:
at the wireless network processor,
adjusting a left edge of the TCP window to a next byte immediately following an end of an out-of-order TCP segment placed adjacent to an end of a last in-order previously received TCP segment; or
adjusting the left edge of the TCP window to a next byte immediately following an end of a last of a plurality of out-of-order TCP segments placed adjacent to an end of a last in-order previously received TCP segment.

11. A system comprising:
a host buffer configured to store data;
a processor in data communication with the host buffer and configured to parse received transmission control protocol (TCP) segments received by a wireless network processor into corresponding TCP header segments or corresponding TCP data segments,
the processor further configured to associate the received TCP segments with a pre-existing end-toend TCP/IP connection established by the wireless network processor using the TCP header segments, the processor further configured to retrieve stored connection state information for the end-to-end TCP/IP connection and direct data movement of the TCP data segments according to the retrieved connection state information and direction information of the TCP header segments;

the processor further configured to store the parsed incoming TCP segments in the host buffer, the processor further configured to determine from the parsed incoming TCP segments, one or more previously received TCP segments and a subsequent received TCP segment, whether a current received TCP segment is an in-order TCP segment or an out-of-order TCP segment with respect to a previously received TCP segment; and when the current received TCP segment is an out-of-order TCP segment:

the processor being further configured to store control information associated with the out-of-order TCP segment at the wireless network processor;

the processor being further configured to place data defining the out-of-order TCP segment in the corresponding portions of the host buffer based on the stored control information so that the out-of-order TCP segment is in order with respect to one or more previously received TCP segments; and recording TCP segment data indicating one or both of
a starting address of the placed data defining the out-of-order TCP segment and an ending address of the placed data defining the out-of-order TCP segment, and
a start buffer address of the placed data defining the out-of-order TCP segment plus information about length of the placed data defining the out-of-order TCP segment, and
recording control information associated with the recorded TCP segment data; and wherein the processor is configured to place the data defining the in-order TCP segment adjacent to an immediately previously received TCP segment in the host buffer, if the current received TCP segment is an in-order TCP segment.

12. The system of claim 11,
wherein the processor is configured to record data indicating:
an end buffer address of the host buffer occupied by an end of the in-order TCP segment; and
a start buffer address plus a length of a data portion of the in-order TCP segment; and
a buffer address of a byte following an end of the in-order TCP segment; and
wherein the processor is further configured to store at the processor control information associated with the indicating data.

13. The system of claim 12,
wherein the processor is further configured to place data defining the in-order TCP segment starting from an address adjacent to a recorded address occupied by an end of the one or more previously received TCP segments in the corresponding portions of the host buffer.

14. The system of claim 11 wherein, if the current received TCP segment is an in-order TCP segment, the processor is configured to place data defining the in-order TCP segment in the corresponding portions of the host buffer adjacent to data defining the previously received TCP segments in the corresponding portions of the host buffer.

15. The system of claim 11 wherein the processor is further configured to define a TCP window among storage of the host buffer and to adjust the TCP window to an end of a last in-order received TCP segment upon placement of the data defining the previously received TCP segments in the corresponding portions of the host buffer.

16. The system of claim 11 wherein the processor is configured to store as the control information data relating to a new hole created by placement of the data of the out-of-order TCP segment.

17. The system of claim 16 wherein the processor is configured to update stored information relating to an existing hole modified by placement of the data of the out-of-order frame, and delete stored information relating to a plugged hole created by the placement of the data of the out-of-order frame.

18. A method comprising:
receiving transmission control protocol (TCP) segments at a wireless network processor;
parsing the incoming TCP segments at the wireless network processor into corresponding TCP header segments and corresponding TCP data segments;
identifying an offloaded TCP/IP connection previously established by the wireless network processor and for which at least some TCP state information is stored by the wireless network processor;
associating the incoming TCP segments with an identified end-to-end TCP/IP connection using the TCP header segments;
retrieving the stored TCP state information for the identified end-to-end TCP/IP connection;
directing data movement of the TCP data segments according to the retrieved connection state information and direction information of the TCP header segments,
storing data defining the parsed incoming TCP segments in a host buffer which is in data communication with the wireless network processor,
defining a TCP window among storage locations of the host buffer;
for the incoming TCP segments, determining whether a current received TCP segment is an in-order TCP segment or an out-of-order TCP segment with respect to a previously received TCP segment; and
for an out-of-order TCP segment:
storing control information associated with the out-of-order TCP segment locally on the wireless network processor;
placing the out-of-order TCP segment in the corresponding portions of the host buffer based on the stored control information so that the current received out-of-order TCP segment is in order with respect to previously received TCP segments;
adjusting the TCP window to an end of a last in-order received TCP segment upon placement of the one or more previously received TCP segments in the corresponding portions of the host buffer; and one of
adjusting a left edge of the TCP window to the next byte immediately following an end of a last in-order received TCP segment placed adjacent to a first received TCP segment, and
adjusting the left edge of the TCP window to a next byte immediately following an end of a last out-of-order TCP segment of a plurality of out-of-order TCP segments placed adjacent to an end of a last in-order previously received TCP segment.

19. The method of claim 18 wherein storing control information comprises:

storing control information associated with a location of the TCP window on the wireless network processor.

20. The method according to claim 19 further comprising updating the stored control information associated with the location of the TCP window whenever the TCP window is adjusted.

\* \* \* \* \*